(12) United States Patent
Jain et al.

(10) Patent No.: US 8,224,837 B2
(45) Date of Patent: Jul. 17, 2012

(54) METHOD AND MECHANISM FOR SUPPORTING VIRTUAL CONTENT IN PERFORMING FILE OPERATIONS AT A RDBMS

(75) Inventors: Namit Jain, Santa Clara, CA (US); Nipun Agarwal, Santa Clara, CA (US); Vikram Kapoor, Sunnyvale, CA (US); Syam Pannala, Fremont, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 523 days.

(21) Appl. No.: 11/172,088

(22) Filed: Jun. 29, 2005

(65) Prior Publication Data

US 2007/0005555 A1 Jan. 4, 2007

(51) Int. Cl.
*G06F 17/30* (2006.01)
(52) U.S. Cl. ....................... 707/763; 707/863
(58) Field of Classification Search ........... 707/1, 999.1, 707/831, 763
See application file for complete search history.

(56) References Cited

U.S. PATENT DOCUMENTS

| | | | | |
|---|---|---|---|---|
| 5,265,239 | A * | 11/1993 | Ardolino | 709/217 |
| 5,937,406 | A * | 8/1999 | Balabine et al. | 1/1 |
| 5,956,712 | A | 9/1999 | Bennett et al. | |
| 5,987,506 | A | 11/1999 | Carter et al. | |
| 6,032,216 | A | 2/2000 | Schmuck et al. | |
| 6,304,873 | B1 | 10/2001 | Klein et al. | |
| 6,321,219 | B1 | 11/2001 | Gainer et al. | |
| 6,321,374 | B1 * | 11/2001 | Choy | 717/106 |
| 6,327,594 | B1 * | 12/2001 | Van Huben et al. | 1/1 |
| 6,393,435 | B1 * | 5/2002 | Gartner et al. | 1/1 |
| 6,442,548 | B1 * | 8/2002 | Balabine et al. | 1/1 |

(Continued)

FOREIGN PATENT DOCUMENTS

EP 0 398 495 11/1990

(Continued)

OTHER PUBLICATIONS

Satyanarayanan, M., "Scalable, secure, and highly available distributed file access," Computer , vol. 23, No. 5, pp. 9-18, 20-21, May 1990.*

Thekkath, C. A., Mann, T., and Lee, E. K., "Frangipani: a scalable distributed file system". ACM Press. SIGOPS Oper. Syst. Rev. 31, 5 (Dec. 1997), 224-237.*

(Continued)

*Primary Examiner* — Baoquoc N To
(74) *Attorney, Agent, or Firm* — Hickman Palermo Truong Becker Bingham Wong LLP

(57) ABSTRACT

Techniques are provided for accessing and storing files within a virtual folder. A virtual folder is a folder that is logically a part of a hierarchical folder structure of a file system repository, but the contents of the virtual folder are not physically stored in the file system repository. A client may issue, to an access mechanism, a request to perform a file operation on a file in a virtual folder. The access mechanism, which may be a database server or a component therein, may perform the file operation on the file in the virtual folder as if the file was stored in a particular folder within the hierarchical folder structure implemented by the file system repository. Advantageously, files may be physically stored outside of the file system repository, but still be a part of the hierarchical folder structure implemented by the file system repository.

26 Claims, 8 Drawing Sheets

U.S. PATENT DOCUMENTS

| | | | |
|---|---|---|---|
| 6,453,313 | B1 | 9/2002 | Klein et al. |
| 6,493,804 | B1 | 12/2002 | Soltis et al. |
| 6,564,215 | B1 | 5/2003 | Hsiao et al. |
| 6,571,259 | B1 | 5/2003 | Zheng et al. |
| 6,718,372 | B1* | 4/2004 | Bober .......................... 709/217 |
| 6,728,709 | B1 | 4/2004 | Plasek et al. |
| 6,732,124 | B1 | 5/2004 | Koseki et al. |
| 6,772,155 | B1 | 8/2004 | Stegelmann |
| 6,799,188 | B2 | 9/2004 | Weedon et al. |
| 6,850,938 | B1 | 2/2005 | Sadjadi |
| 6,907,414 | B1* | 6/2005 | Parnell ............................ 706/47 |
| 6,948,039 | B2 | 9/2005 | Biessener et al. |
| 6,959,313 | B2 | 10/2005 | Kapoor et al. |
| 6,973,455 | B1 | 12/2005 | Vahalia et al. |
| 6,985,905 | B2* | 1/2006 | Prompt et al. ................. 707/829 |
| 7,076,509 | B1 | 7/2006 | Chen et al. |
| 7,085,785 | B2 | 8/2006 | Sawdon et al. |
| 7,139,781 | B2 | 11/2006 | Young et al. |
| 7,162,466 | B2* | 1/2007 | Kaasten et al. .................... 707/1 |
| 7,177,866 | B2 | 2/2007 | Holenstein et al. |
| 7,266,555 | B1* | 9/2007 | Coates et al. .................. 707/827 |
| 7,280,995 | B1 | 10/2007 | Sedlar |
| 7,610,304 | B2* | 10/2009 | Jain et al. ............................. 1/1 |
| 7,730,033 | B2* | 6/2010 | Mohamed ...................... 707/649 |
| 7,765,217 | B2* | 7/2010 | Yamakawa et al. ........... 707/751 |
| 7,783,684 | B2* | 8/2010 | Zayas et al. .................... 707/822 |
| 7,809,917 | B2* | 10/2010 | Burton et al. .................. 711/170 |
| 2001/0051958 | A1 | 12/2001 | deVries et al. |
| 2002/0023126 | A1* | 2/2002 | Flavin ............................ 709/203 |
| 2002/0069324 | A1* | 6/2002 | Gerasimov et al. ........... 711/114 |
| 2002/0078068 | A1* | 6/2002 | Krishnaprasad et al. .. 707/104.1 |
| 2002/0184536 | A1* | 12/2002 | Flavin ............................ 713/202 |
| 2003/0033285 | A1 | 2/2003 | Jalali et al. |
| 2003/0033328 | A1 | 2/2003 | Cha et al. |
| 2003/0069902 | A1 | 4/2003 | Narang et al. |
| 2003/0172149 | A1 | 9/2003 | Edsall et al. |
| 2003/0195862 | A1* | 10/2003 | Harrell, Jr. ......................... 707/1 |
| 2003/0195865 | A1 | 10/2003 | Long et al. |
| 2003/0237051 | A1* | 12/2003 | LaMarca et al. .............. 715/513 |
| 2004/0044643 | A1* | 3/2004 | deVries et al. ..................... 707/1 |
| 2004/0107225 | A1 | 6/2004 | Rudoff |
| 2004/0111422 | A1 | 6/2004 | Devarakonda et al. |
| 2004/0133607 | A1 | 7/2004 | Miloushev et al. |
| 2004/0133652 | A1 | 7/2004 | Miloushev et al. |
| 2004/0153438 | A1* | 8/2004 | Rossiter et al. .................... 707/1 |
| 2004/0167932 | A1 | 8/2004 | Edmonds |
| 2004/0199540 | A1 | 10/2004 | Nojima |
| 2004/0225922 | A1 | 11/2004 | Susarla et al. |
| 2004/0230560 | A1 | 11/2004 | Elza et al. |
| 2004/0230903 | A1 | 11/2004 | Elza et al. |
| 2004/0255048 | A1* | 12/2004 | Lev Ran et al. ............... 709/249 |
| 2005/0004925 | A1 | 1/2005 | Stahl et al. |
| 2005/0050054 | A1 | 3/2005 | Clark et al. |
| 2005/0086384 | A1* | 4/2005 | Ernst ............................. 709/248 |
| 2005/0091287 | A1* | 4/2005 | Sedlar ........................... 707/200 |
| 2005/0120040 | A1 | 6/2005 | Williams et al. |
| 2005/0149525 | A1* | 7/2005 | Verma et al. ...................... 707/8 |
| 2005/0165716 | A1* | 7/2005 | Huang et al. ....................... 707/1 |
| 2005/0203903 | A1 | 9/2005 | Rajan et al. |
| 2005/0210034 | A1 | 9/2005 | Howard |
| 2005/0223047 | A1 | 10/2005 | Shah et al. |
| 2005/0234867 | A1 | 10/2005 | Shinkai |
| 2005/0283504 | A1 | 12/2005 | Suzuki et al. |
| 2005/0289143 | A1 | 12/2005 | Oshri et al. |
| 2006/0129513 | A1 | 6/2006 | Nakatani et al. |
| 2006/0136376 | A1* | 6/2006 | Jain et al. .......................... 707/3 |
| 2006/0136508 | A1 | 6/2006 | Idicula et al. |
| 2006/0136509 | A1 | 6/2006 | Pannala et al. |
| 2006/0136516 | A1* | 6/2006 | Jain et al. ...................... 707/204 |
| 2006/0173851 | A1 | 8/2006 | Singh et al. |

FOREIGN PATENT DOCUMENTS

| | | |
|---|---|---|
| EP | 0 398 495 A2 | 11/1990 |
| EP | 0856803 A | 8/1998 |
| GB | 2 269 920 A | 2/1994 |
| JP | 63-238644 | 10/1988 |
| JP | 04-319734 | 11/1992 |
| JP | 2000-181773 | 6/2000 |
| WO | WO 97/46956 | 12/1997 |

OTHER PUBLICATIONS

Gupta, S.K.S.; Srimani, P.K., "A strategy to manage cache consistency in a disconnected distributed environment," Parallel and Distributed Systems, IEEE Transactions on , vol. 12, No. 7, pp. 686-700, Jul. 2001.*

Gehani, N., et al., "OdeFS: A File System Interface to an Object-Oriented Database", Proc. Of the 20th Conf. on VLDB, Springer-Verlag, © 1994, pp. 1-18.*

Coleco, Glenn, et al., "Database Performance with NAS: Optimizing Oracle on NFS", Sun Microsystems Technical Whitepaper, May 2004, pp. i-ii and 1-28.*

Cuff, James A., et al., "The Ensembl Computing Architecture", Genome Research, vol. 14, Cold Harbor Laboratory Press, ISSN: 1088-9051/04, © 2004, pp. 971-975.*

Bartholomew, Brian, "Pgfs: The PostGres File System", Linux Journal, Oct. 1, 1997, pp. 1-7.*

Sommer, Rainer A., et al., "The n-Tier Hub Technology", ACM SIGMOD Record, vol. 31, No. 1, Mar. 2002, pp. 18-23.*

System Administration Guide, vol. 3, Part No. 806-0916-10, Sun Microsystems, Palo Alto, CA, Feb. 2000, pp. 1-33 and 533-648.*

"NFS Commands", downloaded from: http://publib.boulder.ibm.com/infocenter/aix/v6r1/index.jsp?topic=/com.ibm.aix.com-madmn/doc/commadmndita/nfs_listcommands.htm, Dec. 17, 2009, 1 page.*

"System Management Guide: Communications and Networks", downloaded from: http://www.ncsa.illinois.edu/UserInfo/Resources/Hardware/IBMp690/IBM/usr/share/man/info/en_US/a_doc_lib/aixbman/commadmn/nfs_ref.htm, Dec. 17, 2009, pp. 1-3.*

"Network File System (protocol)", downloaded from: http://en.wikipedia.org/wiki/Network_File_System_(protocol), Dec. 17, 2009, pp. 1-6.*

Microsoft Computer Dictionary, 5th Edition, Microsoft Press, Redmond, WA, © 2002, p. 365.*

Rafii, Abbas, et al., "Multidatabase Management in Pegasus", IMS '91, Kyoto, Japan, Apr. 7-9, 1991, pp. 166-173.*

Spinellis, Diomidis D., "Outwit: Unix Tool-based Programming Meets the Windows World", Proc. of the USENIX 2000 Conf., San Diego, CA, Jun. 18-23, 2000, pp. 149-158.*

Barbará, Daniel, et al., "Information Brokers: Sharing Knowledge in a Heterogeneous Distributed System", Database and Expert Systems Applications, LNCS 720, © 1993, pp. 80-91.*

Yamai, Nariyoshi, et al., "NFS-Based Secure File Sharing over Multiple Administrative Domains with Minimal Administration", Systems and Computers in Japan, vol. 33, No. 14, Dec. 2002, pp. 50-58.*

Pawlowski, Brian, et al., "The NFS Version 4 Protocol", Proc. of the 2nd International System Administration and Networking Conf. (SANE 2000), © 2000, 20 pages.*

"Automounter", Wikipedia, downloaded from en.wikipedia.org/wiki/Automount, Oct. 22, 2010, pp. 1-4.*

International Preliminary Examining Authority, "Notification of Transmittal of the International Preliminary Report on Patentability," PCT/US2005/015033, received Feb. 21, 2007, 7 pages.

Claims as filed on Oct. 13, 2006 for PCT/US2005/015033 (50277-2766), 5 pages. (attached).

International Preliminary Examining Authority, "Notification of Transmittal of the International Preliminary Report on Patentability," PCT/US2005/044134, dated Mar. 3, 2007, 6 pages.

Claims as filed on Jun. 29, 2006 for PCT/US2005/044134 (50277-2938), 3 pages (attached).

Interantional Searching Authority, "Notification of Transmittal of the International Search Report and the Written Opinion of the International Searching Authority, or the Declaration," PCT/US2005/015033, dated Aug. 5, 2005, 12 pages.

Current Claims, PCT/US2005/015033, 5 pages.

No, Jaechun et al., "A Locking Protocol for Distributed File Systems," Parallel and Distributed Computing; Applications and Technologies 5th International Conference, 2004, XP-002337237, pp. 527-530.

International Searching Authority, "Notification of Transmittal of the International Search Report and the Written Opinion of the International Searching Authority, or the Declaration," PCT/US2005/044134, dated Mar. 29, 2006, 11 pages.

Current Claims, PCT/US2005/044134, 5 pages.

Lu, Hongjun, et al., "T-Tree or B-Tree: Main Memory Database Index Structure Revisited," Database Conference, 2000, IEEE Jan. 31, 2000, XP 010370177, pp. 65-73.

Pullin, D.J., "B-Tree index in a Binary Relational Database," IBM Technical Disclosure Bulletin, IBM Corp., New York, vol. 26, No. 7A, Dec. 1983, XP-000714328, pp. 3423-3426.

European Patent Office, "Communication Pursuant to Article 96(2) EPC," App. No. 00952215.2, dated Oct. 5, 2006, received on Oct. 13, 2006, 7 pages.

Amended Claims, EP App. 00952215.2, 26 pages.

Rao, Herman Chung-Hwa, et al., "An Overview of the Internet File System," 1997, IEEE, XP-002204711, pp. 474-477.

Oracle, "Oracle iFS (Internet File System)," Mar. 1999, XP-002204710, 3 pages.

U.S. Appl. No. 11/013,890, filed Dec. 16, 2004, Office Action Mailing Date Apr. 12, 2007.

U.S. Appl. No. 11/014,354, filed Dec. 16, 2004, Office Action Mailing Date May 1, 2007.

U.S. Appl. No. 11/013,519, filed Dec. 16, 2004, Office Action Mailing Date Apr. 20, 2007.

U.S. Appl. No. 11/013,889, filed Dec. 16, 2004, Office Action Mailing Date Apr. 20, 2007.

Madore, David, "GCFS: a Garbage-Collected Filesystem for Linux", Feb. 2000, 15 pages.

Mellande, "Unix File system Security", Jun. 2002, 26 pages.

Callaghan, et al., "NFS Version 3 Protocol Specification", RFC 1813, Jun. 1995, 93 pages.

"Communication pursuant to Article 94(3) EPC" received in Application No. 05 741 078.9-1225 dated Jul. 7, 2009 (5 pages).

Current Claims in Application No. 05 741 078.9-1225 dated Jun. 21, 2007 (3 pages).

The State Intellectual Property Office of P.R.C., Chinese Office Action received in Application No. 200580047631.8, Applicant: Oracle International Corporation, Dated Mar. 3, 2011, 5 pages.

Current Claims in Chinese Application No. 200580047631.8, Applicant: Oracle International Corporation, Dated Mar. 2011 (3 pages).

* cited by examiner

FIG. 2

Information stored in the file system repository

| PARENT | CHILD |
|--------|-------|
| / | Public |
| Public | Foo |
| Public | Foo2 |
| Foo | a.txt |
| Foo2 | John ⸻ callback — 210 |

200

METHOD AND MECHANISM FOR SUPPORTING VIRTUAL CONTENT IN PERFORMING FILE OPERATIONS AT A RDBMS

RELATED APPLICATION DATA

This application is related to U.S. patent application Ser. No. 11/014,354, entitled "Infrastructure For Performing File Operations By A Database Server," filed on Dec. 16, 2004, referred to below as the "file operations patent," which is incorporated by reference in its entirety as if fully set forth herein.

This application is also related to U.S. patent application Ser. No. 11/013,889, entitled "Techniques For Transaction Semantics For A Database Server Performing File Operations," filed on Dec. 16, 2004, which is incorporated by reference in its entirety as if fully set forth herein.

This application is also related to U.S. patent application Ser. No. 11/013,890, entitled "Techniques For Maintaining Consistency For Different Requestors Of Files In A Database Management System," filed on Dec. 16, 2004, which is incorporated by reference in its entirety as if fully set forth herein.

This application is also related to U.S. patent application Ser. No. 11/013,519, entitled "Techniques For Providing Locks For File Operations In A Database Management System," filed on Dec. 16, 2004, which is incorporated by reference in its entirety as if fully set forth herein.

This application is also related to U.S. patent application Ser. No. 11/172,674, entitled "Supporting Replication Among a Plurality of File Operation Servers," filed on Jun. 30, 2005.

This application is also related to U.S. patent application Ser. No. 11/172,472, entitled "Sharing State Information Among a Plurality of File Operation Servers," filed on Jun. 29, 2005, which is incorporated by reference in its entirety as if fully set forth herein.

FIELD OF THE INVENTION

The present invention relates to accessing one or more files that are not stored in a file system repository as if the one or more files were stored in a folder of the file system repository.

BACKGROUND

Data may be stored in many types of storage mechanisms, such as databases and file servers. Each storage mechanism typically has its own means of access. For example, the Structured Query Language (SQL) protocol is typically used to perform operations on a database, and the Network File System (NFS) protocol is typically used to perform operations on a file system. The SQL protocol is an American National Standards Institute (ANSI) standard for accessing and manipulating data stored in a database. The NFS protocol is a distributed file system protocol that supports the performance of file operations on files across a network. NFS is a well-known standard for sharing files between UNIX hosts.

In the NFS protocol, file operations are performed on files using a filehandle, which is an identifier that identifies a particular resource. The current version of NFS, version 4, which is specified in Request for Comments (RFC) 3010, supports additional functionality over version 3, such as enhancements to security and to the performance of stateful operations.

It is desirable to access as many kinds of data as possible from a single storage mechanism. For example, minimizing the number of different types of storage mechanisms that are used to store and access data tends to reduce the amount of resources required to maintain the storage mechanisms. Also, accessing as many kinds of data as possible from a central location, such as a database, promotes ease of use and security, as data need not be accessed from a plurality of mechanisms that each enforce different security policies. Consequently, performing file operations upon as many files as possible through a centralized access mechanism is desirable.

Approaches for accessing data items using a file system operation protocol in a database management system are disclosed in U.S. patent application Ser. No. 11/014,354. According to these approaches, files may be stored in a file system repository maintained by a database server. Clients may perform file operations on files, stored in the file system repository implemented by a database, by communicating with a database server using the file system operation protocol, such as the NFS protocol.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 illustrates an exemplary set of information stored in a file system repository according to an embodiment of the invention;

DETAILED DESCRIPTION

In the following description, for the purposes of explanation, numerous specific details are set forth in order to provide a thorough understanding of the embodiments of the present invention described herein. It will be apparent, however, that the embodiments of the present invention described herein may be practiced without these specific details. In other instances, well-known structures and devices are shown in block diagram form in order to avoid unnecessarily obscuring the embodiments of the present invention described herein.

Functional Overview

Techniques are provided for accessing and storing files within a virtual folder. A virtual folder is a folder that is logically a part of a hierarchical folder structure of a file system repository, but the contents of the virtual folder are not physically stored in the file system repository. According to an embodiment of the invention, a client may issue, to an access mechanism, a request to perform a file operation on a file in a virtual folder. The access mechanism may perform the file operation on the file in the virtual folder as if the file was stored in a particular folder within the hierarchical folder structure implemented by the file system repository. Advantageously, files may be physically stored outside of the file system repository, but still be a part of the hierarchical folder structure implemented by the file system repository. Further, clients may issue requests for the performance of file operations to the same access mechanism, regardless of whether the files happen to be physically stored internally or externally to the file system repository.

A virtual folder may contain a file or another virtual folder, i.e., virtual folders may be nested. Thus, one or more virtual folders may be incorporated into the hierarchical folder structure of a file system repository. Virtual folders may be accessed using the same access mechanism used to access the hierarchical folder structures in which they are incorporated. Thus, the use of virtual folders is transparent to the user requesting a file from the file system repository. In other words, a client supplying a filehandle to a file system repository does not know whether a resource identified by the filehandle is stored in a virtual folder or a non-virtual folder of the hierarchical folder structure of the file system hierarchy.

Virtual Folders

Figure 1:
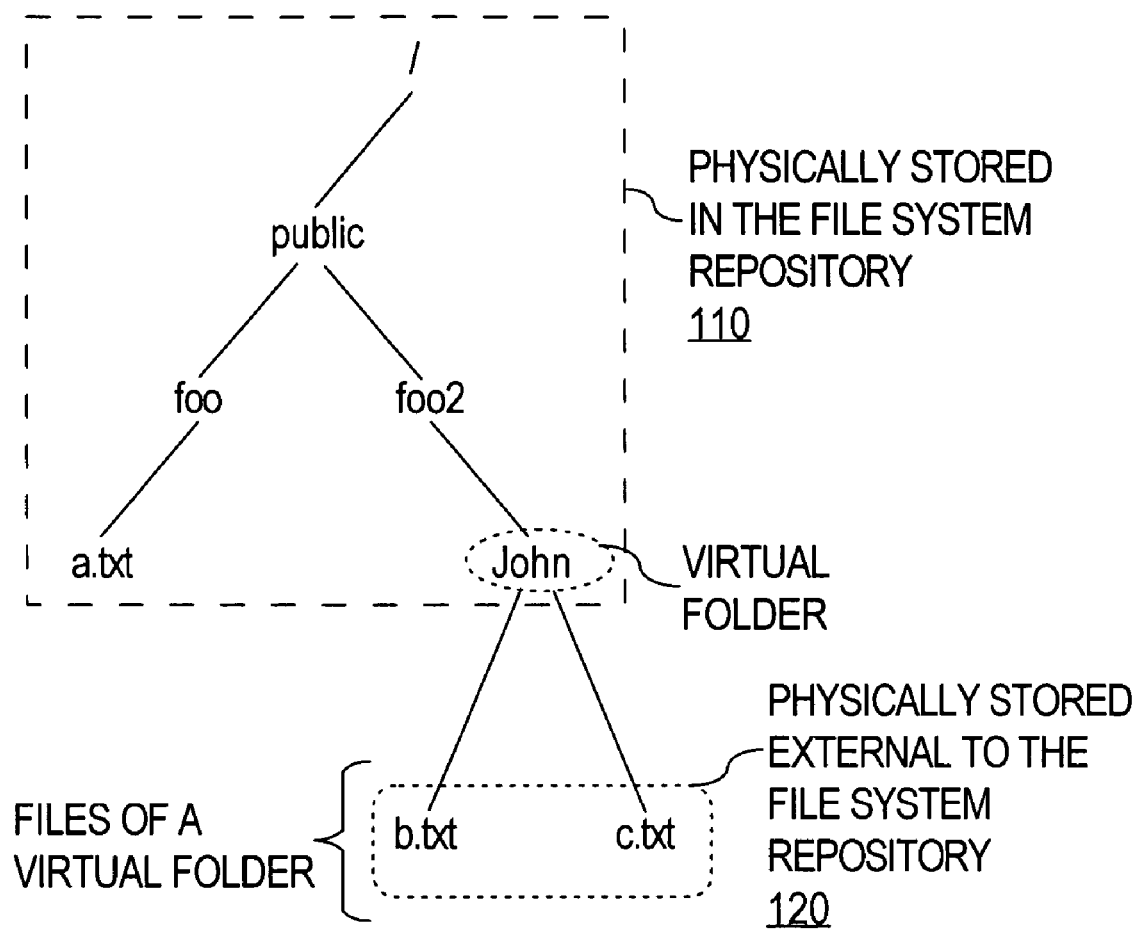
FIG. 1 is an illustration of an exemplary hierarchical folder structure according to an embodiment of the invention.

A file system repository may implement a hierarchical folder structure. FIG. 1 is an illustration of an exemplary hierarchical folder structure 100 according to an embodiment of the invention. As shown in the hierarchical folder structure 100 of FIG. 1, hierarchical folder structure 100 includes folders, e.g. the "public" folder, and files, e.g., the a.txt file.

The term "resource" shall be used when speaking generally about either a folder or a file of a hierarchical folder structure implemented by a file system repository. The phrase "contents of a folder" shall be used to refer to any resources logically associated with a particular folder, e.g., the contents of the "public" folder are the folders entitled "foo" and "foo2," while the contents of the "John" folder are the files b.txt and c.txt. A resource stored in a virtual folder shall be referred to as a virtual resource. A resource that is not stored in a virtual folder (i.e., it is stored in a folder of the hierarchical folder structure implemented by information stored in the file system repository) shall be referred to as a non-virtual resource.

Files and folders identified by group 110 are physically stored in the file system repository implementing the hierarchical folder structure 100. FIG. 2 illustrates an exemplary set of information 200 storing the files and folders of group 110 of FIG. 1 in a file system repository according to an embodiment of the invention. While the set of information 200 depicted in FIG. 2 includes only the names of files and folders for ease of explanation, the set of information 200 may include any data or metadata associated with the files and/or folders, such as the file size, folder creation time, and the file itself.

The set of information 200 of FIG. 2 may be stored in a variety of mechanisms, depending on how the file system repository is implemented. For example, the file operations patent, identified above, describes techniques for implementing a file system repository in a database. Thus, the set of information 200 may be stored, in one example, in one or more tables of the database implementing the file system repository.

The folder entitled John is a virtual folder, which means that while the John folder is logically part of the hierarchical folder structure 100, the contents of the John folder are not stored in the file system repository. For example, data and metadata for resources in group 120, namely the b.txt file and the c.txt file, are not depicted in the set of information 200 of FIG. 2.

The contents of a virtual folder may be determined by accessing a callback function associated with the virtual folder. For example, in the set of information 200, the file system repository maintains data that associates callback function 210 with the virtual folder John. Callback function 210 may be executed to determine the contents of virtual folder John, i.e., to obtain the b.txt file and the c.txt file. Although not depicted in FIG. 2, other callback functions may be associated with the virtual folder John to perform other functions using the John virtual folder.

The process of creating virtual folders and obtaining their contents using callback functions shall be described in further detail below; however, before doing so, it may be helpful to describe an illustrative architecture for receiving and processing requests from clients according to an embodiment of the invention.

Architecture Overview

Figure 3:
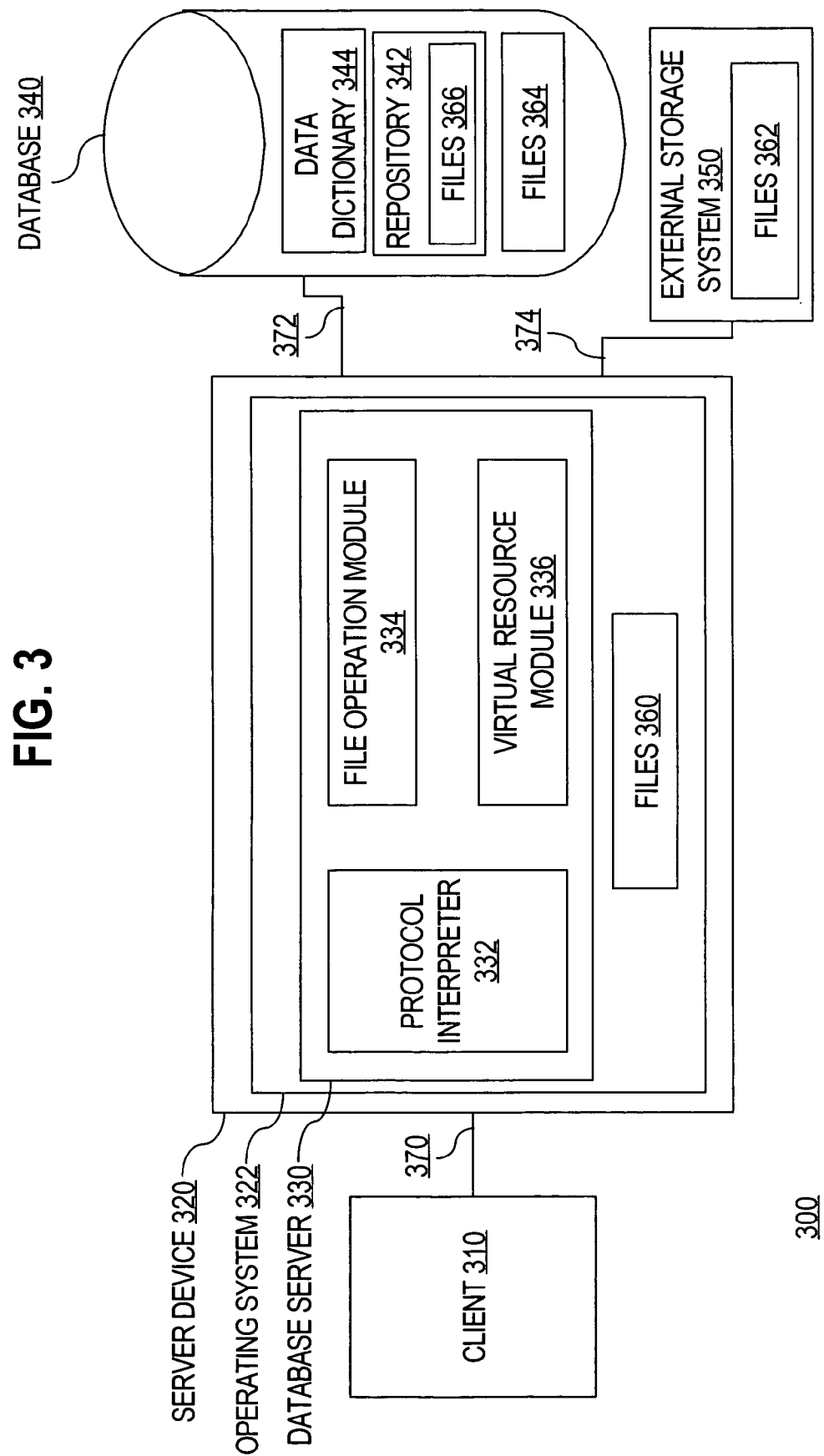
FIG. 3 is a block diagram of an illustrative system according to an embodiment of the invention.

FIG. 3 is a block diagram of an illustrative system 300 according to an embodiment of the invention. In the embodiment depicted in FIG. 3, system 300 includes a client 310, a server device 320, a database 340, and communications links 370 and 372. Optionally, system 300 may also include external storage system 350 and communications link 374. The server device 320 may process requests, received from client 310, to perform file operations on a file stored in a hierarchical folder structure, regardless of whether the file is physically stored in the repository 342, the database 340, the external storage system 350, the operating system 322 of the server device 320, or elsewhere.

Client 310 may be implemented by any medium or mechanism that is capable of issuing a request, to perform a file operation on a file, to server device 320 over communications link 370. For example, a user may use client 310 to retrieve a file from a hierarchical folder structure implemented by a file system repository by issuing a request to perform a file operation to server device 320. A non-limiting, illustrative example of client 310 includes an application, executing on a device, which is capable of requesting the performance of an NFS file operation. For ease of explanation, only one client 310 is depicted in FIG. 3, although other embodiments of the invention may comprise two or more clients 310.

Server device 320 refers to any physical machine upon which the functionality performed by protocol interpreter 332, file operation module 334, and virtual resource module 336 (each of which is described below) may be implemented. Server device 320 may include an operating system 322. The operating system 322 may implement a file system that allows one or more files, such as files 360, to be stored therein. Database server 330 may execute on the server device 320. For ease of explanation, only one server device 230 is depicted in FIG. 3, although other embodiments may include two or more server devices 320.

A database server 330 may be implemented by any medium or mechanism that is capable of receiving and processing requests, from client 310, for the performance of file operations. For this reason, database server 330 may be referred to as a file operations server in the description below. Database server 330 may receive and process a request, from client 310, to retrieve a particular file belonging to a virtual folder (the particular file may be physically stored in a variety of locations, such as in database 340 or external storage system 350).

Database server 330 includes a protocol interpreter 332, a file operation module 334, and a virtual resource module 336. A protocol interpreter 332 is a software component that receives requests from clients, dispatches the received request to a component of database server 330 for processing, and thereafter sends the results of processing the request back to client 310 in a response. For example, in response to the protocol interpreter 332 receiving a request to perform a file operation involving a file stored in file system repository 342, the protocol interpreter 332 may transfer the request to the file operation module 334 for processing. As another example, in response to the protocol interpreter 332 receiving a request to perform a file operation involving a virtual folder, the protocol interpreter 332 may transfer the request to the virtual resource module 336 for processing.

For ease of explanation, the examples discussed herein involve protocol interpreter 332 receiving a file system operation request (such as a NFS file system operation) from client 310, although protocol interpreter 332 may receive and process requests conforming to a variety of protocols, such as Hypertext Transfer Protocol/Distributed Authoring and Versioning (HTTP/DAV), File Transfer Protocol (FTP), SQL, etc.

As explained in further detail below, in an embodiment, the protocol interpreter 332 maintains state information that describes the state of processing file operations at the database server 330 in volatile memory. Various mechanisms may be used by the protocol interpreter 332 to maintain the state information in volatile memory, such as a set of b-trees or a set of hash tables. Additional description of the protocol interpreter 332 is provided in the file operations patent identified above.

A file operation module 334 is a software component that processes requests to perform file operations, received from client 310, that do not involve virtual resources. In processing requests from client 310, the file operation module 334 may read the request to obtain a filehandle that identifies a resource that is physically stored in the file system repository 342.

A virtual resource module 336 is a software component that also processes requests to perform file operations that database server 330 received from client 310. However, unlike the file operation module 334, the virtual resource module 336 processes requests to perform file operations upon virtual resources. For example, virtual resource module 336 may process requests to perform a file operation by reading a request to obtain a filehandle that identifies a virtual resource, such as a virtual folder.

While virtual resource module 336 is depicted in FIG. 3 as being separate and distinct from file operation module 334, in other embodiments, the virtual resource module 336 and the file operation module 334 may be implemented as part of the same functional entity.

Database 340 refers to any mechanism for persistently storing data. For example, database 340 may be implemented using the Oracle 10 g database, available from Oracle Corporation of Redwood Shores, Calif. Database 340 may be implemented on one or more physical machines. Database 340 includes a file system repository 342 and a data dictionary 344. File system repository 342 refers to any file system repository for storing a hierarchy of folders and files. For example, file system repository 342 may be implemented using a NFS file system repository.

Data dictionary 344, as broadly used herein, refers to any information maintained by database 340 for uniquely identifying, to the database 340, the resources that are stored in database 340. For example, data dictionary 344 may contain a list of database resource identifiers. Each database resource identifier (sometimes referred to as an object identifier, or OID) uniquely identifies a particular resource stored in the database 340. A data dictionary 344 may also contain other bookkeeping information used by the database 340 to manage the resources stored therein.

In an embodiment, file system repository 342 may maintain a "virtual data dictionary," which is a virtual folder that references information maintained in data dictionary 344. As explained in further detail below, such a virtual data dictionary may be used by the file system repository 342 to uniquely identify, within a virtual folder, resources that are physically stored in database 340, but not in file system repository 342. For example, if a virtual folder contained a file that is part of files 364, since the database 340 stores information in the data dictionary 344 that uniquely identifies each file in files 364, the repository 342 may use the virtual data dictionary to uniquely identify the files in the virtual folder, even though such files are not physically stored within the file system repository 342.

For ease of explanation, system 300 is depicted in FIG. 3 as including a database server 330 and a database 340. However, database 340 may be implemented by any persistent storage mechanism, and database server 330 may be implemented by any mechanism capable of retrieving and storing data from the persistent storage mechanism implementing database 340. Thus, embodiments of the invention may be implemented using persistent storage mechanisms, other than a database management system (DBMS), for storing and retrieving data.

External storage system 350 may be implemented by any medium or mechanism that provides for storing one or more files, such as files 362. External storage system 350 may be used to physically store files that are logically associated with a virtual folder of the hierarchical folder structure implemented by file system repository 342.

Communications link 370 may be implemented by any medium or mechanism that provides for the exchange of data between client 310 and server device 320. Communications link 372 may be implemented by any medium or mechanism that provides for the exchange of data between server device 320 and database 340. Communications link 374 may be implemented by any medium or mechanism that provides for the exchange of data between server device 320 and external storage system 350. Examples of communications links 370, 372, and 374 include, without limitation, a network such as a Local Area Network (LAN), Wide Area Network (WAN), Ethernet or the Internet, or one or more terrestrial, satellite or wireless links.

System 300 may include zero or more external storage systems 350, and one or more databases 340. Thus, embodiments of the invention may employ a different number of external storage systems 350 and/or databases 340 than those that are depicted in FIG. 3. Having described an illustrative system 300 according to an embodiment, the process of creating a virtual folder using system 300 shall now be described.

Creating a Virtual Folder

A virtual folder may be used to physically store files external to the file system repository 342, while logically being a part of the hierarchical folder structure implemented by the file system repository 342. The entity that physically stores the resources of a virtual folder shall be referred to as the virtual folder implementer for that virtual folder. For example, if files 362 are filed in a first virtual folder, and external storage system 350 physically stores files 362, then external storage system 350 shall be said to be the virtual folder implementer of the first virtual folder. Similarly, if files 360 are filed in a second virtual folder, and operating system 322 physically stores files 360, then operating system 322 shall be said to be the virtual folder implementer of the second virtual folder.

To create a new virtual folder, information is stored that enables the virtual resource module 336 to communicate with the virtual folder implementer of the new virtual folder. In this way, the virtual resource module 336 may perform file operations involving resources belonging to a virtual folder by communicating with the virtual folder implementer.

A user, such as an administrator, may use a client 310 to create a new virtual folder in a hierarchical folder structure implemented by file system repository 342. In an embodiment, to create a new virtual folder, the user uses client 310 to send, to database server 330, a request to create the new virtual folder. The protocol interpreter 332 receives the request, and sends the request to the virtual resource module 336 for processing. The virtual resource module 336 creates the new virtual folder by causing information, which describes how to communicate with the virtual folder implementer, to be stored in the file system repository 342. The virtual resource module 336 may communicate with the user in a series of one or more messages to obtain the information that describes how to communicate with the virtual folder implementer in performing file operations involving the new virtual folder.

In an embodiment, to facilitate the communication between the virtual resource manager 336 and the virtual folder implementer, the virtual folder implementer may register one or more callback functions with the virtual resource manager 336. When the virtual folder implementer registers a callback function with the virtual resource manager 336, the virtual resource manager 336 stores information that enables the virtual resource manager to call the callback function being registered. For example, the virtual resource manager 336 may make an entry for the new virtual folder in a callback table stored in file system repository 342. The callback table associates one or more callback functions with the new virtual folder. An entry for a new virtual folder may identify one or more callback functions that, when invoked by the virtual resource manager 336, cause the virtual folder implementer to perform a function using the new virtual folder.

To illustrate, a callback function registered with the virtual resource manager 336 may perform, when executed, one or more of the following file operations using the new virtual folder:
 1. Retrieving a resource based on a path to the resource
 2. Retrieving the first resource in a list of resources in a particular file
 3. Retrieving the next resource in a list of resources in a particular file
 4. Exiting from a list of resources in a particular file
 5. Creating a resource
 6. Creating a link
 7. Deleting a resource
 8. Updating a resource
 9. Renaming a resource To illustrate, to create a new resource in a particular virtual folder, the virtual resource module 336 calls a particular callback function, associated with the particular virtual folder, to cause the virtual folder implementer to create a resource within the particular virtual folder.

The contents of a virtual folder may or may not be stored in database 340. Indeed, the files logically associated with a virtual folder may be physically stored in any persistent storage mechanism capable of registering callback functions with the virtual resource module 336. For example, files for a first virtual folder may be a part of files 364, while files for a second virtual folder may be a part of files 360 or files 362. As a result, depending on where the resources of a particular virtual folder are physically stored, the native capabilities of database 340 may or may not be available.

If a file of a virtual folder is stored within the database 340, then the virtual resource module 336 may use certain mechanisms provided by database 340 to perform certain operations, such as reading, writing, lock checking, and access control/security operation, on the file. In this way, the virtual resource module may use the same locking and security mechanisms upon virtual resources stored in database 340 as non-virtual resources stored in file system repository 342. For example, to perform a lock operation (such as lock or unlock) or a security operation (such as checking whether a user has sufficient access privileges to access a file or setting the access privilege level required to access a file) on a file, the virtual folder manager 336 may call the same callback functions of database 340 to perform those operations as if the file was stored within the file system repository 342. This is so because in both cases the database 340 is storing the virtual resource, regardless of whether the virtual resources happens to be stored as part of the file system repository 342.

On the other hand, if the virtual folder implementer is not database 340, then the virtual resource module 336 may store information describing additional callback functions supported by the virtual folder implementer. These additional callback functions may be used by the virtual resource module 336 to perform additional functions on virtual folders. For example, if the virtual folder implementer is not database 340, then the virtual folder implementer may register callback functions to perform one or more of the following file operations:
 1. Read a resource
 2. Write to a resource
 3. Lock a resource
 4. Unlock a resource
 5. Set the access control privileges for a resource
 6. Check the access control privileges for a resource
 7. Check the lock state of a resource In an embodiment, when a virtual folder implementer registers a callback function to create a resource within the virtual folder, the virtual folder implementer is responsible for providing a virtual resource identifier with any resource stored within a virtual folder. A virtual resource identifier uniquely identifies, to the virtual resource module 336, any resource stored in a virtual folder managed by the virtual resource module 336. As described in further detail below, virtual resource identifiers may be used in generating filehandles for virtual resources obtained from a virtual folder implementer.

The virtual resource identifier may be composed in any manner that allows a variety of virtual folder implementers to each create virtual resource identifiers that uniquely identify, to the virtual resource module 336, a virtual resource. In order to prevent two different virtual folder implementers from assigning the same virtual resource identifier to different virtual resources, in an embodiment, each virtual folder implementer may create virtual resource identifiers by ensuring that a portion of a virtual resource identifier is unique to that virtual folder implementer. For example, a first virtual folder implementer may create virtual resource identifiers using a prefix of "abc1," and a second virtual folder implementer may create virtual resource identifiers using a prefix of "abc2," etc. In this way, each virtual folder implementer is guaranteed to generate virtual resource identifiers that are different than those generated by any other virtual folder implementer.

Having described how a virtual folder is created according to an embodiment of the invention, the use and generation of filehandles in system 300 shall be described.

The Use and Generation of Filehandles

In file system protocols, such as NFS, file operations are performed on resources using a filehandle, which is an identifier that uniquely identifies a particular resource. Thus, when the client 310 transmits a request for the performance of a file operation on a particular resource, the request will contain a filehandle that uniquely identifies that resource.

Filehandles are opaque to client 310. In other words, the client 310 does not need to be able to parse or process any information contained in the filehandle. Instead, when a client 310 wishes to receive a particular file, the client 310 sends a request to receive the particular file, along with the filehandle associated with the file, to the database server 330. In return, the client will receive the requested file from the database server 330.

While filehandles are opaque to client 310, the database server 330, and the components thereof, may read information that was incorporated into the filehandle at the time the filehandle is generated. This information is used by the database server 330, and the components thereof, in performing the requested file operations on the resources identified by the filehandle. Further description of how filehandles are generated, and the information that may be incorporated into the filehandle when it is generated, is provided below.

Generating a Filehandle for a Non-Virtual Resource

Anytime that the database server 330 sends a resource, such as a file, to the client 310, the database server 330 sends a filehandle, identifying the resource, to the client 310. In an embodiment, the file operation module 334 processes file operations, received at database server 330, to be performed on resources stored in file system repository 342. As a result of processing such a file operation, anytime that the file operation module 334 sends a resource back to the client 310, the file operation module 334 generates a filehandle for the resource previously stored in the file system repository 342, if the filehandle is not otherwise already available, to allow the file operation module 334 to send the filehandle back to the client 310 along with the requested resource.

In an embodiment, to generate a filehandle for a resource physically stored in the file system repository 342, the file operation module 334 generates the filehandle based, at least in part, on an object identifier (OID), assigned by the database 340, that uniquely identifies the resource to that database 340. Thus, each filehandle generated in this fashion uniquely identifies a particular resource stored in the file system repository 342. By generating filehandles in such a manner, the file operation module 334 may inspect a filehandle to determine the object identifier, and thereafter locate the particular resource in the file system repository 342 based on the object identifier.

In an embodiment, the file operation module 334 also generates the filehandle to include a flag that identifies that the resource identified by the filehandle is not a virtual resource. In this way, the protocol interpreter 332 may subsequently inspect the filehandle, and determine that the resource identified by the filehandle is not a virtual resource based on the flag contained in the filehandle.

Thus, in an embodiment, the file operation module 334 may generate a filehandle based on the following formula:

filehandle=flag+object identifier

Filehandles may be expressed in a variety of formats. As a result, the above formula for generating a filehandle for a non-virtual resource is only an example of one embodiment, and other embodiments may use different information in generating filehandles for non-virtual resources, or may use the same information, but express the information in a different format. For example, the filehandle may recite the flag and the object identifier directly, or the flag and/or the object identifier may recite the flag and/or the object identifier indirectly, e.g., the object identifier may be processed according to an algorithm to avoid reciting the exact object identifier, used by the database 340, in the filehandle.

Generating a Filehandle for a Virtual Resource

In an embodiment, the virtual resource module 336 processes file operations, received at database server 330, to be performed on resources stored externally to file system repository 342. As a result of processing such a file operation, anytime that the virtual resource module 336 sends a resource back to the client 310, the file operation module 334 generates a filehandle for the resource stored externally to file system repository 342, if the filehandle is not otherwise available (the filehandle may have been already generated).

In an embodiment, to generate a filehandle for a resource physically stored external to file system repository 342, the virtual resource module 336 generates the filehandle based, at least in part, on a virtual resource identifier that uniquely identifies the resource to that virtual resource module 336.

The virtual resource module 336 may obtain a virtual resource identifier for a virtual resource in a variety of different ways. According to one embodiment, if the virtual resource is stored in the database 340, then the virtual resource module may access information in the data dictionary 344 to obtain the object identifier (OID) associated with the virtual resource, and use the object identifier as the virtual resource identifier. For example, the virtual resource module 336 may access a virtual data dictionary, implemented within the file system repository 342, to access information in the data dictionary 344 to obtain the object identifier (OID) associated with the virtual resource. The virtual resource module 336 may then use the OID for the virtual resource as the virtual resource identifier.

In another embodiment, if the virtual resource is stored external to database 340, then the virtual resource module 336 obtains the virtual resource identifier, for a virtual resource, from a callback function supported by the virtual resource implementer storing the virtual resource. As previously discussed, a virtual folder implementer registers a callback function, with the virtual resource module 336, that provides the virtual resource module 336 with a virtual resource identifier anytime a new resource is created or accessed in the virtual folder. For example, if a client 310 requests to receive the contents of a virtual folder, then the virtual resource module 336 will call a callback function associated with that virtual folder, and the virtual folder implementer will send back the resources of that virtual folder, along with a virtual resource identifier associated with each resource therein.

By generating filehandles in such a manner, the virtual resource module 336 may inspect a filehandle to determine the virtual resource identifier, and thereafter locate the particular resource based on the virtual resource identifier. The virtual resource module 336 maintains data that associates virtual resource identifiers with the virtual resources they identify. In this way, the virtual resource module 336 can identify a particular virtual resource using a virtual resource identifier.

In an embodiment, virtual resource module 336 may also generate filehandles to contain a flag that identifies whether the resource identified by the filehandle is a virtual resource. For example, if the filehandle is associated with a virtual folder, then a flag in the filehandle may indicate that the folder is a virtual folder. In this way, when the protocol interpreter 332 examines a filehandle contained in a request, the protocol interpreter 332 may determine, based on this flag, that the resource identified by the filehandle is a virtual resource and send the request to the virtual resource module 336 for processing.

In an embodiment, the virtual resource module 336 may also generate a filehandle to contain a virtual folder identifier. A virtual folder identifier is information that uniquely identifies, to the virtual resource module 336, which virtual folder is associated with the resource associated with the filehandle that contains the virtual folder identifier. The virtual resource module 336 may inspect a filehandle to determine which virtual folder is associated with the resource identified by the filehandle. In this way, the virtual resource module 336 may determine which virtual folder is associated with the virtual resource identified by the filehandle, and by extension, the virtual resource module 336 may determine which virtual folder implementer is physically storing the virtual resource identified by the filehandle.

Thus, in an embodiment, the virtual resource module 336 may generate a filehandle based on the following formula:

filehandle=flag+virtual resource identifier+virtual folder identifier

As discussed above, filehandles may be expressed in a variety of formats. As a result, the above formula for generating a filehandle for a virtual resource is only an example of one embodiment, and other embodiments may use different information in generating filehandles for virtual resources, or may use the same information, but express the information in a different format.

In an embodiment, both the file operations module 334 and the virtual resource module 336 may generate filehandles in network byte order. In other words, the filehandles may be generated such that the most significant byte is first (as in big endian storage), regardless of how the information encoded in the filehandle is actually stored.

Having described how filehandles are generated for non-virtual and virtual resources according to an embodiment, the process of accessing resources using the filehandles shall now be explained according to an embodiment of the invention.

Accessing Files in a Virtual Folder

Figure 4:
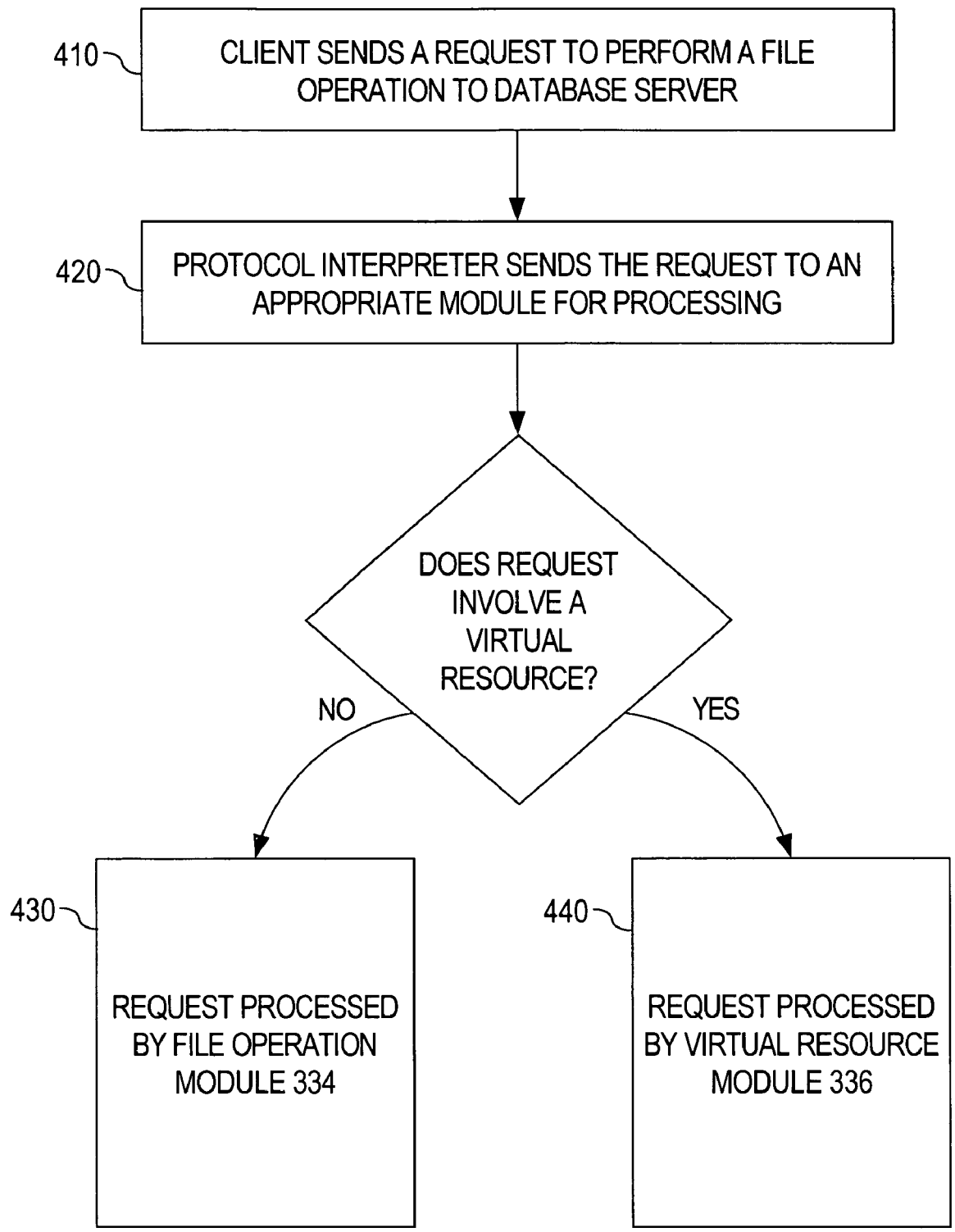
FIG. 4 is a flowchart illustrating the functional steps of accessing a file organized in a hierarchical folder structure, which includes a virtual folder, implemented by file system repository according to an embodiment of the invention.

FIG. 4 is a flowchart illustrating the functional steps of accessing a resource, such as a file, organized in a hierarchical folder structure, which includes a virtual folder, implemented by file system repository 342 according to an embodiment of the invention. In step 410, client 310 sends a request to perform a file operation to database server 330 over communications link 370. The request sent by client 310 may be a NFS file operation.

In an embodiment, the database server 330 may receive the request of step 410 at the protocol interpreter 332. In another embodiment, the database server 330 may receive the request of step 410, and thereafter send the received request to the protocol interpreter 332 in step 410. After the protocol interpreter 332 receives the request from the client 310, processing proceeds to step 420.

In step 420, protocol interpreter 332 sends the request to an appropriate component for processing. In determining which component is appropriate for processing the request, the protocol interpreter 332 may consider the type of protocol in which the request is expressed. For example, the protocol interpreter 332 may receive requests conforming to a variety of different protocols, such as FTP, HTTP, and NFS, and requests of each type of protocol may be processed by different components of database server 330. For example, the protocol interpreter 332 may determine that the request received in step 410 is a request to perform a file operation because the request is in conformance with a file system operation protocol, such as the NFS protocol. As a result, the protocol interpreter 332 may send the request to a component responsible for processing file operations.

Both the file operation module 334 and the virtual resource module 336 process file operations. To determine which component to send received request for the performance of a file operation, in an embodiment, the protocol interpreter 332 determines whether the request for the performance of a file operation involves a virtual resource. The protocol interpreter 332 may inspect the filehandle, associated with the request, to read the virtual flag contained within the filehandle. If the virtual flag indicates that the resource identified by the filehandle is not a virtual resource, then the protocol interpreter 332 sends the request to file operation module 334 for processing. On the other hand, if the virtual flag indicates that the resource identified by the filehandle is a virtual resource, then the protocol interpreter 332 sends the request to virtual resource module 336 for processing.

To illustrate, assume that the request of step 410 is a request to retrieve the contents of a particular virtual folder identified by a filehandle contained within the request. Thus, in step 420, the protocol interpreter 332 would send the request to virtual resource module 336 for processing because the flag in the filehandle would indicate, to the protocol interpreter, that the virtual folder is a virtual resource. After the performance of step 420, processing proceeds to step 430 if the request of step 410 does not involve a virtual resource. On the other hand, after the performance of step 420, processing proceeds to step 440 if the request of step 410 does involve a virtual resource.

In step 430, the request to perform a file operation not involving a virtual resource is processed by the file operation module 334. The file operation module 334 processes the file operation request using the filehandle contained in the request. The file operation module 334 may identify the particular resource in the file system repository 342 against which the file operation is directed by inspecting the filehandle to determine the object identifier, which uniquely identifies, to the file operation module 334, the particular resource.

After the file operation module 334 has processed the requested file operation, the file operation module generates responsive data that describes the result of processing the request. The responsive data is then transmitted to the protocol interpreter 332. The protocol interpreter 332 then sends the responsive data back to the client 310 in a response.

Figure 5:
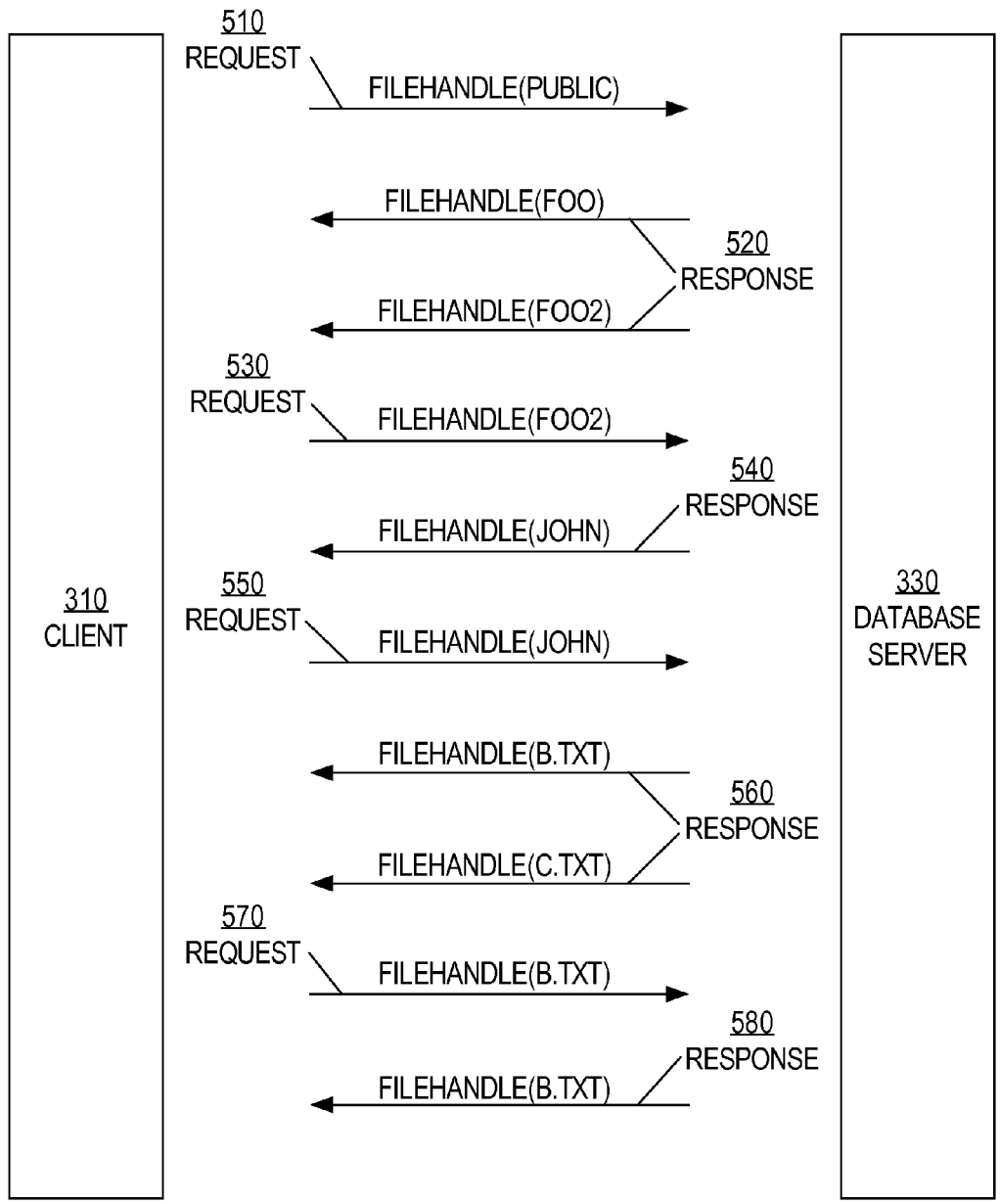
FIG. 5 is an illustration of several requests, and their corresponding responses, communicated between the client and the database server according to an embodiment of the invention.

To illustrate, FIG. 5 is an illustration of several requests, and their corresponding responses, communicated between the client 310 and the database server 330 according to an embodiment of the invention. FIG. 5 makes reference to the hierarchical folder structure depicted in FIG. 1. As shown in FIG. 5, initially, client 310 transmits a request 510 to database server 330. Request 510 is a request for the performance of a file operation to list the contents of the public folder. When the protocol interpreter 332 receives request 510, the protocol interpreter 332 will forward request 510 to file operation module 334, since request 510 does not involve a virtual resource because the public folder is not a virtual resource.

File operation module 334 processes request 510, and generates responsive data that identifies (a) the resources in the public folder (namely, the foo folder and the foo2 folder), and (b) a filehandle associated with each resource in the public directory. The file operation module 334 sends the responsive data to the protocol interpreter 332. When the protocol interpreter 332 receives the responsive data, the protocol interpreter 332 communicates the responsive data to the client 310 in response 520.

As another example, client 310 may transmit request 530 to database server 300. Request 530 is a request for the performance of a file operation to list the contents of the foo2 folder. When the protocol interpreter 332 receives request 530, the protocol interpreter 332 will forward request 530 to file operation module 334, since request 530 does not involve a virtual resource because the foo2 folder is not a virtual resource. File operation module 334 processes request 530, and generates responsive data that identifies (a) the resource in the foo2 folder (namely, the virtual folder John), and (b) a filehandle associated with the John folder. The file operation module 334 sends responsive data to the protocol interpreter 332. When the protocol interpreter 332 receives the responsive data, the protocol interpreter 332 communicates the responsive data to the client 310 in response 540.

When the client 310 sends a request to database server 330 that involves a virtual resource, processing proceeds to step 440.

In step 440, the request to perform a file operation involving a virtual resource is processed by the virtual resource module 336. The virtual resource module 336 processes the file operation request using the filehandle contained in the request. The virtual resource module 336 may identify the particular resource in the file system repository 342, against which the file operation is directed by inspecting the filehandle to determine the virtual resource identifier, which uniquely identifies, to the virtual resource module 334, the particular resource.

After the virtual resource module 336 has processed the requested file operation, the virtual resource module generates responsive data that describes the result of processing the request. The responsive data is then transmitted to the protocol interpreter 332. The protocol interpreter 332 then sends the responsive data back to the client 310 in a response.

Another example of performing step 440 shall be presented referring again to FIG. 5. Client 310 may transmit a request 550 to database server 330. Request 550 is a request for the performance of a file operation to list the contents of the virtual folder entitled John. When the protocol interpreter 332 receives request 550, the protocol interpreter 332 will forward request 550 to virtual resource module 336, since request 550 involves a virtual resource, namely the John virtual folder.

Virtual resource module 336 processes request 550, and generates responsive data that identifies (a) the resources in the John virtual folder (namely, the b.txt file and the c.txt file), and (b) a filehandle associated with each resource in the John virtual folder. The virtual resource module 336 sends the responsive data to the protocol interpreter 332. When the protocol interpreter 332 receives the responsive data, the protocol interpreter 332 communicates the responsive data to the client 310 in response 560.

As another example, client 310 may transmit request 570 to database server 330. Request 570 is a request for the performance of a file operation to obtain the file entitled b.txt. When the protocol interpreter 332 receives request 570, the protocol interpreter 332 will forward request 570 to virtual resource module 336, since request 570 involves a virtual resource because the b.txt file is stored in a virtual folder. Virtual resource module 336 processes request 570, and generates responsive data that contains the b.txt file and a filehandle associated with b.txt file. The file operation module 334 sends the responsive data to the protocol interpreter 332. When the protocol interpreter 332 receives the responsive data, the protocol interpreter 332 communicates the responsive data to the client 310 in request 580.

Advantageously, client 310 may access a resource in a virtual folder in the hierarchical file structure implemented by the file system repository 342, even though the particular resource is not physically stored in the file system repository 342. Therefore, the use of virtual folders greatly enhances the accessibility of resources by providing a single access mechanism, accessible via the submission of file operations, to logically store files in a hierarchical folder structure implemented by a file system repository in a manner that allows the files to be physically stored in a variety of locations, including locations external to the file system repository.

Sharing State Information Among a Plurality of File Operation Servers

In an embodiment, the database server 330 may store state information that describes the state of processing file operations at database server 330. For example, the protocol interpreter 332 may store state information that describes the state of processing file operations at database server 330, including all file operations processed by both the file operations module 334 and the virtual resource module 336.

Embodiments of the invention include systems that include multiple database servers, and each database server may share state information with one or more other database servers in the system. Advantageously, a client that was previously being serviced by the first database server may subsequently be serviced by one of the one or more other database servers with which the state information was shared.

For example, a client may send a first request to perform a first stateful file operation, such as locking a particular file, to a first database server. The first database server may process the request, and send a response to the client. Thereafter, the client may send a second request to perform a second file operation, such as writing to the particular file, to a second database server. If writing to the particular file requires that the client have a lock on the particular file, the second database server may process the second request because state information is shared between the first database server and the second database server.

In this way, a client may be serviced by any of a plurality of database servers, since the state of processing stateful file operations is shared among the plurality of database servers. As a result, load-balancing techniques may be employed to increase the likelihood that requests from clients are received by database servers with the most available bandwidth to process the requests. Further, if the first database server becomes inoperable for planned (such as when an administrator takes a server offline to perform maintenance on the server) or unplanned reasons (such as when the first database server crashes), then another database server may take over in lieu of the inoperable database server.

Architecture Overview of Multiple Database Servers Accessing the Same Database

Figure 6:
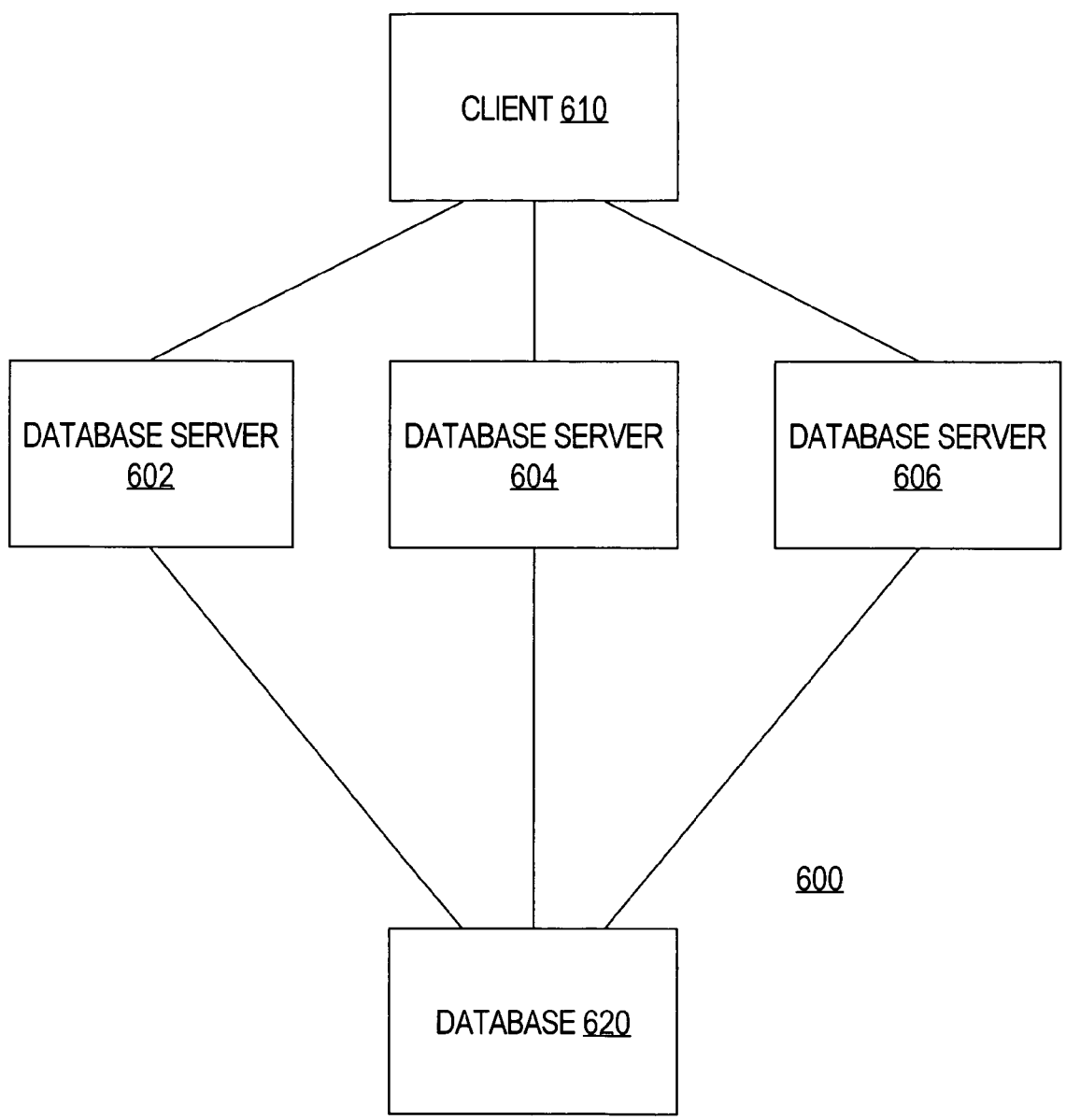
FIG. 6 is a block diagram of a system that includes multiple database servers according to an embodiment of the invention.

FIG. 6 is a block diagram of a system 600 that includes multiple database servers, namely database server 602, 604, and 606, according to an embodiment of the invention. System 600 also includes a client 610 and a database 620. Client 610 and database 620 each operate as described above with respect to client 310 and database 340 respectively. While only one client 610 is depicted in FIG. 6 for ease of explanation, system 600 may contain any number of clients 610.

Database servers 602, 604, and 606 each operate as described above with respect to database server 330, except that database servers 602, 604, and 606 each access the same database, namely database 620. Importantly, each of database server 602, 604, and 606 may share state information with one or more other database servers of system 600. The arrangement of multiple database servers accessing a single database, such as depicted in FIG. 6, may be achieved, in an embodiment, by using the Real Application Cluster (RAC) feature of the Oracle 10 g DBMS, available from Oracle Corporation of Redwood Shores, Calif.

Although not depicted in FIG. 6, in some embodiments of the invention, a redirector component may be operationally positioned between the client 610 and the database servers 602, 604, and 606. A redirector is a functional component that redirects a request, from a client, to a particular database server based, at least in part, on which database server has the most available bandwidth to process the request. In this way, a client may issue a request, for the performance of a file operation, and the request may be received by the redirector. The redirector may then forward the request to one of database servers 602, 604, or 606 based on which database server has the most available bandwidth to process the request.

Having described an illustrative architecture, involving multiple database servers that each may share state information, additional description about the state information stored at database servers is now presented.

State Information Stored at a Database Server

In an embodiment, the state information, stored at a particular database server of system 600, may include information that describes any change to the state of processing file operations performed at that database server. For example, state information may include information describing, for each client for which the database server is processing file operation, at least the following types of states: (a) the client/open state, (b) the locking state, and (c) the client lease expiry state.

The client/open state describes, for a particular client 610, the files that the client 610 has opened. The client/open state further describes information about the client 610, particularly about how a database server is to communicate with the client 610, such as the client's network address (e.g., an IP address). In an embodiment, the client/open state is updated whenever the client 610 connects to a database server, open a file, writes to a file, or closes a file.

In an embodiment, the client/open state is shared across all database servers of system 600 to ensure that all subsequent requests, sent from client 610, may be processed properly by any database server of system 600. For example, if database server 602 processes a request, from client 610, to open a file, and thereafter database server 604 processes a request, from client 610, to read the same file, information reflecting the state of processing the open file operation should be propagated from database server 602 to database server 604 prior to database server 604 processing the request to read the file. Additional description of the information maintained in the client/open state is available in the file operations patent identified above.

In an embodiment, the locking state describes information about the locks that client 610 has been granted. The locking state is updated anytime that client 610 locks or unlocks a particular file. Client 610 may be granted a lock on a range of bytes (a "byte-range lock") on files in file system repository 342. In an embodiment, information in the locking state may not be updated as frequently as the client/open state; however, the locking state should be shared between each database server in system 600 to ensure each database server in system 600 processes file operations correctly. Additional description of the locks that may be granted to client 610, and thus the kinds of information maintained in the locking state, is available in the file operations patent identified above.

In an embodiment, the client lease expiry state describes the state of leases granted to client 610, i.e., the client lease expiry state describes when any lease granted to client 610 will expire. As described in further detail in the file operations patent identified above, file-based locks are lease-based, which means that once a particular file-based lock is granted to a requester, the particular lock is granted for a first period of time, after the expiration of which the particular lock expires. However, any communication received by the requester renews the particular lock for a second period of time. Thus, a requester may continually renew a file-based lock as long as the requester communicates with a database server before the file system lock expires.

In an embodiment, the client lease expiry state only is shared whenever the client lease expiry state is about to expire. Thus, if the client lease expiry state is updated at database server 602, database server 602 may determine not to share the client lease expiry state with database servers 604 and 606 if the lease is not likely to expire. In this way, communications exchanged between database servers of system 600 may be minimized by not sharing the client lease expiry state when it is unlikely that the lease will expire.

The file operations patent, identified above, describes several mechanisms for storing state information at a database server. According to one embodiment, state information is maintained using a lookup mechanism maintained by protocol interpreter 332. In one embodiment, the lookup mechanism is implemented using a plurality of B-trees maintained in volatile memory. The plurality of B-trees store state information used in processing stateful file system operation requests. For example, the plurality of B-trees may store requestor data, file data, and lock data. Requestor data is data that identifies requestors that are registered to issue file system operations. File data is data that identifies which files have been opened by which requesters. Lock data is data that identifies which locks on which files have been granted to which requesters.

In one embodiment, the plurality of B-trees, maintained by protocol interpreter 332, include a "client B-tree," a "client_ exists B-tree," a "requester B-tree," an "open_files B-tree," an "opens B-tree," a "locks_requestor B-tree," and a "granted_ locks B-tree." Each of these B-trees may store state information, and shall be described in further detail below.

Other embodiments of the invention may store state information using a different set of B-trees. For example, several B-trees mentioned above, e.g., the client_exists B-tree, store information that is also stored in other B-trees, and so all the B-trees mentioned above may not be necessary for other implementations. However, it may be advantageous to store the same or similar information in more than one B-tree, as the information may be more efficiently accessed using a first key in a first circumstance, and may be more efficiently accessed using a second key in a second circumstance.

In other embodiment of the invention, state information may be stored using other storage mechanisms instead of using a plurality of B-trees, such as one or more hash tables. Having described state information in further detail, an illustrative set of b-trees, used by protocol interpreter 332 in storing state information according to an embodiment of the invention, shall be presented.

The Client B-Tree

The client B-tree is a B-tree that maintains information about all clients in the system 600. Each client 610 in system 600 is reflected in an index entry within the client B-tree. A client 610 registers with system 600 by issuing, to a database server in system 600, a request to establish a client identifier. The key of the client B-tree is a client identifier previously assigned to client 610 by a database server in system 600. A client identifier uniquely identifies a particular client 610 registered with the system 600. Each node of the client B-tree stores the information about a particular client in system 600, including the client identifier and a client-provided identifier, such as a network address of the client.

The Client_Exists B-Tree

Similar to the client B-tree, the client_exists B-tree maintains information about clients. While both the client B-tree and the client_exists B-tree maintain information about clients, the key of the client-exists B-tree is a client-provided identifier. The client-provided identifier may be, for example, the network address of the client.

The client_exists B-tree may be used to determine, based on the client-provided identifier, whether a particular client has registered with the system 600. Each index entry of the client_exists B-tree also stores the information about a particular client, including the client identifier and a client-provided identifier.

The Requestor B-Tree

Client 610 may be implemented by a medium or mechanism that is capable of issuing multiple requests for the performance of a file operation concurrently. For example, a client 610 may correspond to an application executing on a device, and the application may be comprised of multiple processes that each may transmit requests for the performance of a file operation to a database server in system 600. Therefore, to avoid confusion, the term "requestor" is used herein to refer to any entity that issues a request for the performance of a file operation to a database server in system 600. For example, a requestor may correspond to client 610, a process executing on client 610, or a process spawned by client 610.

The requestor B-tree is a B-tree that maintains information about requestors. The key of the requestor B-tree reflects both a client identifier associated with a requestor and a requestor identifier that uniquely identifies the requestor. The requestor B-tree may be used to determine all requestors associated with a particular client 610, which may be needed during the processing of a file system operation to open a file or when recovering a client that has become non-operational.

Each index entry of the requestor B-tree stores the information about a requestor. For example, an index entry of the requestor B-tree that corresponds to a particular requestor may store information about which client is associated with the requester, when the last communication from the requester was received, which files the requestor has opened, and what state information is associated with the requestor.

The Open_Files B-Tree

The open_files B-tree is a B-tree that maintains information about files that have been opened. The key of the open_files B-tree is the filehandle of a file. The open_files B-tree may be used to determine whether it is possible to perform a file system operation on a particular file. Each index entry of the open_files B-tree may store information about an open file. Such information may include, for example, the number of file-based locks on the open file, the type of file-based locks on the open file, what state identification data identifies state information associated with the open file, and an object identifier for the open file.

The Opens B-Tree

The opens B-tree is a B-tree that maintains information about files that have been opened. The key of the opens B-tree is state identification data. By traversing the opens B-tree, one can locate information about the open file associated with the state information identified by the state identification data used as the key to the opens B-tree.

For example, assume that a client has opened a particular file. The state information maintained for the client will indicate that the client has opened the particular file. The state information will be assigned to a set of state identification data. The state identification data may be used to traverse the opens B-tree to find an index entry that indicates that the particular file is open.

Each index entry of the opens B-tree stores information about an open file, such as state identification data that identifies state information associated with the open file, the requestor that opened the open file, whether the file was opened for reading or writing, whether the open file has been modified, and whether reading or writing has been denied to any other requestor other than the one which opened the open file.

To open a file, state identification data is generated to identify the open file. The state identification data is (a) transmitted to the requestor that requested the file to be open, and (b) used to add an entry to the opens B-tree to reflect that the file has been opened.

The Locks_Requestor B-Tree

The locks_requestor B-tree is a B-tree that maintains information about lock requesters. The key to the locks_requestors B-tree is a state identification data. Each index entry of the locks_requestor B-tree contains information about the requestor of a lock, such as the client identifier, the requestor identifier, and the lock owner identifier. The lock owner identifier uniquely identifies a particular requestor that is granted a lock. The client identifier and the requestor identifier are assigned by a database server in system 600, and the lock owner identifier is supplied by the requester.

The Granted_Locks B-Tree

The granted_locks B-tree is a B-tree that maintains information about granted locks. The key to the granted_locks B-tree tree is a filehandle. The granted_locks B-tree may be used to quickly determine which file-based locks, if any, have been granted on a particular file.

When the protocol interpreter 332 instructs a component of a database server to perform a file system operation that requests the grant of a particular lock (hereinafter a "resource locker"), the resource locker may access one or more B-trees, maintained by protocol interpreter 332, which store state information. The resource locker may initially determine if a conflicting lock has already been granted on the file by accessing the granted locks B-tree. The resource locker may traverse the granted_locks B-tree using the filehandle of the file identified by the file system operation. If an entry in the granted_locks B-tree exists for the filehandle, an examination of the entry will inform the resource locker whether a conflicting lock has already been granted on the file.

If the resource locker determines that a conflicting lock has not already been granted on the file, then the resource locker may (a) generate new state identification data to identify the new state of the resource, and (b) add an entry to the granted_locks B-tree to reflect the grant of the requested lock. The resource locker may add a new entry to the granted_locks B-tree using the newly generated new state identification data for the resource, and thereafter, delete the prior entry in the locks B-tree that was referenced by the prior state identification data. The new entry in the locks B-tree contains a reference to all the prior stateful operations performed on the resource, so it is unnecessary to store the entry referenced by the prior state identification data.

Having described the types of state information that may be stored at a particular database server, and several approaches for storing the state information at a database server, several different approaches for sharing state information between database servers will now be discussed.

Sharing State Information Persistently

According to a first embodiment, state information may be shared between database servers by durably storing information describing a change in state. For example, database server 602 may durably store information that identifies a change in state to database 620. Thereafter, another database server, such as database server 604, may read the information identifying the change in state from database 620. This approach for sharing state information is referred to as the persistent approach.

The information about the change in state may identify any change or update made to the state information maintained by a database server. For example, any change in the state of processing file operations discussed above, such as a change in the (a) the client/open state, (b) the locking state, and/or (c) the client lease expiry state, may be propagated from one database server to another database server in this manner.

Advantageously, additional database servers, such as database server 606, may also read the information identifying the change in state from database 620. Thus, any number of database servers in system 600 may read the information identifying the change in state from database 620.

Sharing State Information Via an in-Memory Transfer

According to another embodiment, state information may be propagated from one database server to another database server by transmitting, from a first volatile memory at a first server to a second volatile memory at a second server, information identifying the change in state. This approach for sharing state information is referred to as the in-memory transfer approach.

For example, information about a change in state may be transmitted from the volatile memory of database server 602 to the volatile memory of database server 604. Additionally, information about a change in state may be transmitted from the volatile memory of database 602 to the volatile memory of all other database servers in system 600. In this way, any number of database servers in system 600 may receive information identifying the change in state from database server 602.

Any method for transferring information from one volatile memory to another may be used to transfer information identifying a change in state at a first database server to one or more other database servers. For example, an approach for transferring information from one volatile memory to another volatile memory is described in U.S. Pat. No. 6,353,836, issued to Bamford et al.

Sharing State Information Using a Hybrid Apporach

According to another embodiment, state information may be shared between database servers in system 600 using both the persistent approach and the in-memory transfer approach. In other words, some state information may be shared via the persistent approach and other state information may be shared via the in-memory transfer approach. This approach is referred to as the hybrid approach.

In an embodiment, a change in state may be associated with a priority, and the approach used to share the state information describing the change in state may be determined based on the priority of the change in state. For example, a change in the client/open state may be determined to be a high priority, and thereafter state information describing the change in the client/open state may be propagated to one or more database servers via the persistent approach. On the other hand, a change in the client lease expiry state may be determined to be a low priority if it is unlikely that the lease will actually expire, and thereafter state information describing the change in the client lease expiry state may either not be propagated at all, or be propagated to one or more database servers via the in-memory transfer approach.

In another embodiment, the approach used to share state information may be based on the type of state information the change in state represents. For example, a change in the client/open state is propagated to one or more database servers via the persistent approach. On the other hand, a change in the locking state is propagated to one or more database servers via the in-memory transfer approach.

In an embodiment, after updating the state information stored at a particular database server, the particular database server determines whether the change in state should be replicated at one or more database servers. This determination may be based on the priority level, or the type of state information, associated with the change in state. Some changes in state, associated with a first priority level, may not be replicated to other database servers by persistently storing the change in state to database 620, while other changes in state, associated with a second priority level, may not be replicated to other database servers at all. For example, as explained above, in one embodiment, the client lease expiry state may only be propagated to another database server if it is likely that the lease will actually expire. In other embodiments, all changes in state may be replicated by sharing state information persistently.

In an embodiment, for performance reasons, a first database server may propagate state information only to one other database server, rather than all other database servers in the system 600. Such an embodiment may be advantageous if only a single alternate source is desired for a particular database server. For example, in one embodiment, database server 602 may only propagate state information to database server 604, rather than additionally to database server 606. In this fashion, the overhead involved in propagating state information to database server 606 may be avoided, while at the same time, database server 604 reflects the same state of processing file operations as database server 602. Thus, if database server 602 becomes unavailable, clients 610 previously being serviced by database server 602 may thereafter be redirected to database server 604 for servicing, since the state of performing stateful file operations was propagated from database server 602 to database server 604.

Supporting Replication Among a Plurality of File Operation Servers

Certain file systems protocols, such as NFS, support replicating files from a first file system repository to another file system repository. For example, each filehandle in the NFS protocol has the attribute "fs_locations." The fs_locations attribute of a filehandle identifies one or more locations that may be a source of the resource identified by the filehandle. Locations may be identified by a variety of ways, e.g., by server name or by IP address. In this way, if a first source of a file becomes unavailable, then the client may access the file from a second source.

Embodiments of the invention may operate to support replication by providing a client with the ability to access a file from a variety of sources. As shown in FIG. 6, multiple database servers may access the same database, namely database 620. Each of database servers 602, 604, and 606 can function as a source of a file stored in the file system repository implemented by database 620.

As explained above, a database server may use information stored in the database in generating a filehandle to uniquely identify a resource. For example, a database server may use an object identifier (OID) when generating a filehandle. In this way, any database server accessing the same database would generate the same filehandle for a particular resource. Thus, if a first database server is provided with a filehandle generated by a second database server, then the first database server would interpret the filehandle in exactly the same way as the second database server. Therefore, the first database server can perform file operations on the particular resource, identified by the filehandle, using the same filehandle generated by the second database server.

Further, this technique may be extended to include virtual folders by sharing information about each virtual folder implementer with each database server. In an embodiment, when a virtual folder implementer registers callback functions with database server 602, the virtual folder implementer also registers the callback functions with database server 604 and 606. Since each database server has access to the same set of callback functions, each database server will interpret virtual object identifiers in the same manner. Thus, any of database servers 602, 604, and 606 can process a request, from client 610, requesting the performance of a file operation involving a virtual resource, since each of database servers 602, 604, and 606 will process the filehandle accompanying the request in the same way since each of database servers 602, 604, and 606 have access to the same set of callback functions.

As a result, in an embodiment, a component of each database server, such as protocol interpreter 332, maintains information about the location of each other database server in the system. For example, protocol interpreter 332 of database server 602, 604, and 606 may maintain information about the location (such as IP address) of each other database server. Then, whenever client 610 requests information about an alternate source for a file, the database server may respond by providing information, to client 610, that identifies the location of the other database servers. For example, database server 602 may inform client 610 that the client 610 may also obtain files from database server 604 and 606. Client 610 may use this information to access any resource, of the hierarchical folder structure implemented by the file system repository, from database server 604 or database server 606.

Accessing a File at an Alternate File Operation Server

Figure 7:
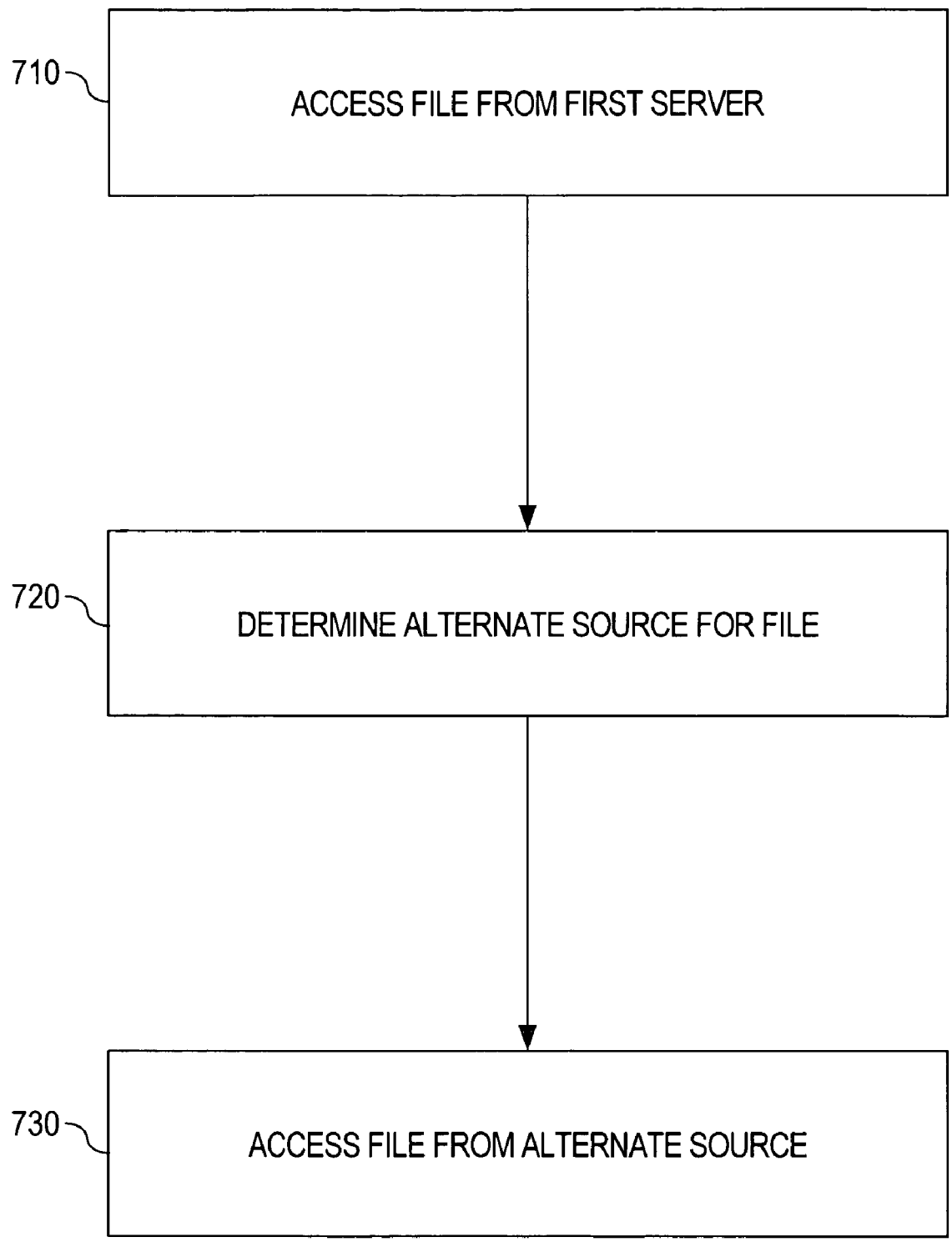
FIG. 7 is a flowchart illustrating the functional steps of accessing a file at an alternate file operation server.

FIG. 7 is a flowchart illustrating the functional steps of accessing a file at an alternate file operation server. The steps of FIG. 6 shall be explained below with reference to the system depicted in FIG. 6.

In step 710, a file is accessed from a first file operation server. In an embodiment, step 710 may be performed by client 610 sending a request to access a particular file database server 602. In response, database server 602 sends a response to the client that contains the filehandle for the file being accessed. After the performance of step 710, processing proceeds to step 720.

In step 720, an alternate source for the file is determined. In an embodiment, an alternate source for the file being accessed may be determined by client 310 accessing an attribute of the filehandle returned in step 710. For example, the "ls_locations" attribute of the filehandle may provide the client 310 with a list of alternate sources for the file identified by the filehandle. Client 610 may access the "ls_locations" attribute by sending a request to database server 602. Database server 602 may service the request using information, stored at database server 602 (such as in protocol interpreter 332), about the locations of other database servers in system 600. For example, if client 610 accessed the ls_locations attribute of the filehandle, then client 610 would discover that the file may be obtained at either database server 604 or database server 606. After the performance of step 720, processing proceeds to step 730.

In step 730, the file is accessed from the alternate source. In an embodiment, step 730 may be performed by client 610 sending a request to database server 606.

Advantageously, the approaches discussed herein allow client 610 to obtain a file, stored in a virtual or non-virtual folder of the hierarchical folder structure implemented by a file system repository implemented by a database, by issuing a request for the performance of a file operation to any database server that is operationally coupled to the database.

Transferring State in Support of Replication

While filehandles may be interpreted similarly by any database server in system 600, the state of performing file operations may be different at each database server. Thus, in one embodiment, any change in state, occurring at a first database server in system 600, is propagated to one or more other database server in system 600 using any technique discussed above, such as the persistent approach, the in-memory transfer approach, or the hybrid approach.

For example, assume that the client 610 transmitted a request, to perform a file operation, to database server 602. As a result of processing the request, client 610 obtained a filehandle for file abc.txt, and database server 602 stored state information that reflects a lock granted to client 610 on the abc.txt file. Thus, if client 610 subsequently sends requests to perform file operation on file abc.txt to database 604, client 610 does not need to obtain the lock on file abc.txt again, since state information describing the lock granted on the abc.txt file to client 610 has been propagated from database server 602 to database server 604.

In another embodiment, changes in state, occurring at a database server in system 600, are not propagated to other database servers in system 600. As a result, anytime the client 610 accesses a new database server for a file, it is the responsibility of client 610 to recreate the state of processing file operations at a new database server. This is so because, while the new database server and process file operations on the filehandle, the new database server is not aware of prior stateful file operations, requested by the client, performed by other database servers, using the filehandle because state information is not propagated between database servers.

For example, assume that the client 610 transmitted a request, to database server 602, to perform a file operation. As a result of processing the request, client 610 obtained a filehandle for file abc.txt, and database server 602 stored state information that reflects a lock granted to client 610 on the abc.txt file. If client 610 subsequently sends requests to perform file operation on file abc.txt to database 604, client 610 will need to obtain the lock on file abc.txt again, since state information describing the lock granted on the abc.txt file to client 610 has not been propagated from database server 602 to database server 604.

Implementing Mechanisms

Figure 8:
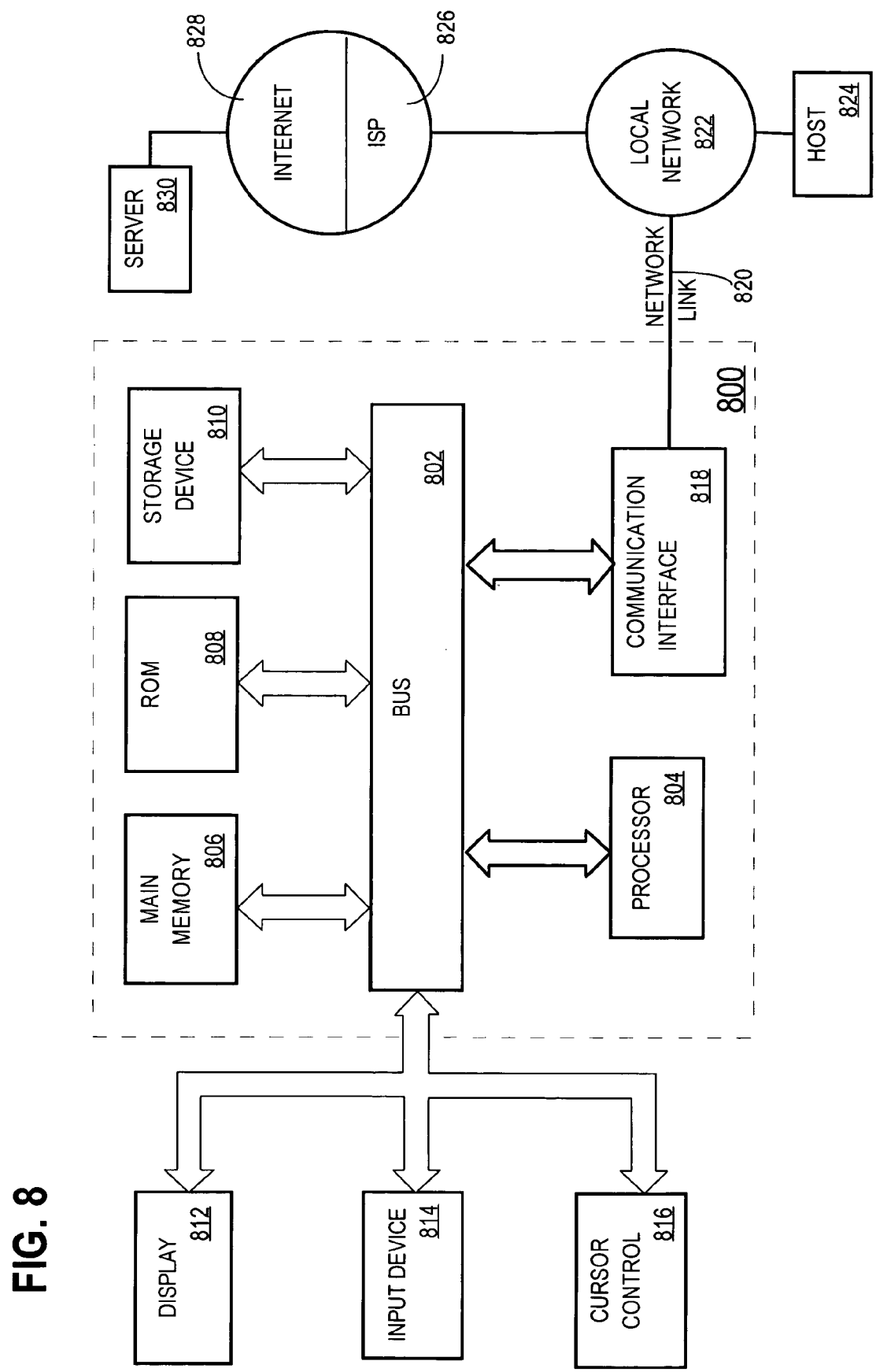
FIG. 8 is a block diagram that illustrates a computer system upon which an embodiment of the invention may be implemented.

In an embodiment, a client, server device, database, and external storage device may each be implemented on a computer system. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for providing access to one or more files:
    wherein the method is performed by one or more computing devices implementing an SQL-supporting database server that processes SQL commands and commands that conform to a file system protocol to store a plurality of files in folders within a hierarchical folder structure implemented by a repository;
    wherein the method comprises:
    receiving a file system command at the SQL-supporting database server, wherein the file system command conforms to the file system protocol, wherein the command references a file as if said file were stored in a particular folder within the hierarchical folder structure that is implemented by said repository;
    determining whether the file is stored in said repository;
    in response to determining that the file is not stored in the repository, the SQL-supporting database server responding to the file system command by accessing information associated with said file, said information being located in a location other than said repository;
    wherein said repository is stored in a relational database managed by the SQL-supporting database server.

2. The method of claim 1, further comprising:
    obtaining an identifier that uniquely identifies the file relative to the location; and
    generating a filehandle for said file based, at least in part, on the identifier;
    wherein the identifier is different than the filehandle.

3. The method of claim 2, wherein said step of obtaining an identifier is performed by accessing information, maintained by a database that is implementing said repository, identifying items stored in said database.

4. The method of claim 2, wherein the filehandle includes a flag indicating that the file is not in the repository and data indicating a virtual folder in said hierarchical structure at which the file is deemed to be located.

5. The method of claim 1, further comprising:
    storing, in association with an identifier for the file, data indicating a callback function to an external entity responsible for providing access to said file at the location, wherein execution of said callback function by the external entity causes the external entity to perform an operation with respect to the file;
    wherein the SQL-supporting database server accessing information associated with said file comprises the SQL-supporting database server looking up the callback function using at least the identifier, and, upon locating the callback function, sending the callback function to the external entity.

6. The method of claim 5, wherein the callback function, when executed by the external entity, causes the external entity to retrieve the file using an identifier that uniquely identifies the file relative to the location.

7. The method of claim 1, further comprising:
    receiving a second file system command at the SQL-supporting database server, wherein the second file system command requests to create a virtual folder, within said hierarchical folder structure;
    in response to the second file system command, storing data for the virtual folder, said data indicating one or more callback functions to an external entity responsible for providing access, at the location, to information associated with one or more files indicated by the repository as being within the virtual folder, wherein the one or more files include the file.

8. The method of claim 7, further comprising receiving data indicating said one or more callback functions from a user.

9. The method of claim 1, further comprising:
    the database server performing a lock operation on the file, wherein the lock operation is performed using a same lock mechanism that is used for locking files stored within said repository.

10. The method of claim 1, further comprising:
    the database server performing a security operation on the file, wherein the security operation is performed using a same security mechanism that is used for performing security operations on files stored within said repository.

11. The method of claim 1, wherein the location other than said repository is a file system external to the relational database.

12. The method of claim 1, wherein the file system command is a first file system command and the file is a first file, the method further comprising:
    receiving a second file system command at the SQL-supporting database server, wherein the command references a second file as if said second file were stored in a second folder within the hierarchical folder structure that is implemented by said repository;
    determining whether the second file is stored in said repository; and
    in response to determining that the second file is stored in the repository, the SQL-supporting database server responding to the file system command by reading information associated with said second file from the relational database.

13. The method of claim 1 wherein the file system protocol is Network File System (NFS).

14. A volatile or non-volatile storage storing one or more sequences of instructions for providing access to one or more files, wherein execution of the one or more sequences of instructions by one or more processors causes the one or more processors to perform the steps of:
    implementing an SQL-supporting database server that processes SQL commands and commands that conform to a file system protocol to store a plurality of files in folders within a hierarchical folder structure implemented by a repository;
    receiving a file system command at the SQL-supporting database server, wherein the file system command conforms to the file system protocol, wherein the command references a file as if said file were stored in a particular folder within the hierarchical folder structure that is implemented by said repository;
    determining whether the file is stored in said repository;
    in response to determining that the file is not stored in the repository, the SQL-supporting database server responding to the file system command by accessing information associated with said file, said information being located in a location other than said repository;
    wherein said repository is stored in a relational database managed by the SQL-supporting database server.

15. The volatile or non-volatile storage of claim 14, wherein execution of the one or more sequences of instructions by the one or more processors further causes the one or more processors to perform the steps of:
    obtaining an identifier that uniquely identifies the file relative to the location; and
    generating a filehandle for said file based, at least in part, on the identifier;
    wherein the identifier is different than the filehandle.

16. The volatile or non-volatile storage of claim 15, wherein said step of obtaining an identifier is performed by accessing information, maintained by a database that is implementing said repository, identifying items stored in said database.

17. The volatile or non-volatile storage of claim 15, wherein the filehandle includes a flag indicating that the file is not in the repository and data indicating a virtual folder in said hierarchical structure at which the file is deemed to be located.

18. The volatile or non-volatile storage of claim 14, wherein execution of the one or more sequences of instructions by the one or more processors further causes the one or more processors to perform the step of:
    storing, in association with an identifier for the file, data indicating a callback function to an external entity responsible for providing access to said file at the location, wherein execution of said callback function by the external entity causes the external entity to perform an operation with respect to the file;
    wherein the SQL-supporting database server accessing information associated with said file comprises the SQL-supporting database server looking up the callback function using at least the identifier, and, upon locating the callback function, sending the callback function to the external entity.

19. The volatile or non-volatile storage of claim 18, wherein the callback function, when executed by the external entity, causes the external entity to retrieve the file using an identifier that uniquely identifies the file relative to the location.

20. The volatile or non-volatile storage of claim 14, wherein execution of the one or more sequences of instructions by the one or more processors further causes the one or more processors to perform the step of:
    receiving a second file system command at the SQL-supporting database server, wherein the second file system command requests to create a virtual folder, within said hierarchical folder structure;
    in response to the second file system command, storing data for the virtual folder, said data indicating one or more callback functions to an external entity responsible for providing access, at the location, to information associated with one or more files indicated by the repository as being within the virtual folder, wherein the one or more files include the file.

21. The volatile or non-volatile storage of claim 20, wherein execution of the one or more sequences of instructions by the one or more processors further causes the one or more processors to perform the step of receiving data indicating said one or more callback functions from a user.

22. The volatile or non-volatile storage of claim 14, wherein execution of the one or more sequences of instructions by the one or more processors further causes the one or more processors to perform the step of:
    the database server performing a lock operation on the file, wherein the lock operation is performed using a same lock mechanism that is used for locking files stored within said repository.

23. The volatile or non-volatile storage of claim 14, wherein execution of the one or more sequences of instructions by the one or more processors further causes the one or more processors to perform the step of:
    the database server performing a security operation on the file, wherein the security operation is performed using a same security mechanism that is used for performing security operations on files stored within said repository.

24. The volatile or non-volatile storage of claim 14, wherein the location other than said repository is a file system external to the relational database.

25. The volatile or non-volatile storage of claim 14, wherein the file system command is a first file system command and the file is a first file, wherein execution of the one or more sequences of instructions by the one or more processors further causes the one or more processors to perform the steps of:
    receiving a second file system command at the SQL-supporting database server, wherein the command references a second file as if said second file were stored in a second folder within the hierarchical folder structure that is implemented by said repository;
    determining whether the second file is stored in said repository; and
    in response to determining that the second file is stored in the repository, the SQL-supporting database server responding to the second file system command by reading information associated with said second file from the relational database.

26. The volatile or non-volatile storage of claim 14, wherein the file system protocol is NFS.

* * * * *

UNITED STATES PATENT AND TRADEMARK OFFICE
CERTIFICATE OF CORRECTION

PATENT NO. : 8,224,837 B2  
APPLICATION NO. : 11/172088  
DATED : July 17, 2012  
INVENTOR(S) : Jain et al.

It is certified that error appears in the above-identified patent and that said Letters Patent is hereby corrected as shown below:

On page 2, in column 2, under "Other Publications", line 59, delete "Interantional" and insert -- International --, therefor.

On page 2, in column 2, under "Other Publications", line 68, delete "Interantional" and insert -- International --, therefor.

On page 3, in column 2, under "Other Publications", line 4, delete "Apr. 20, 2007." and insert -- Apr. 12, 2007. --, therefor.

In column 20, line 28, delete "Apporach" and insert -- Approach --, therefor.

Signed and Sealed this
Twenty-fifth Day of September, 2012

David J. Kappos
*Director of the United States Patent and Trademark Office*